United States Patent
Foltz, IV et al.

(10) Patent No.: US 10,502,252 B2
(45) Date of Patent: Dec. 10, 2019

(54) PROCESSING OF ALPHA-BETA TITANIUM ALLOYS

(71) Applicant: ATI Properties LLC, Albany, OR (US)

(72) Inventors: John W. Foltz, IV, Albany, OR (US); Gavin Garside, Windsor Hills, CA (US)

(73) Assignee: ATI PROPERTIES LLC, Albany, OR (US)

( * ) Notice: Subject to any disclaimer, the term of this patent is extended or adjusted under 35 U.S.C. 154(b) by 524 days.

(21) Appl. No.: 14/948,941

(22) Filed: Nov. 23, 2015

(65) Prior Publication Data

US 2017/0146046 A1    May 25, 2017

(51) Int. Cl.
| | |
|---|---|
| F16B 33/00 | (2006.01) |
| C22C 14/00 | (2006.01) |
| F16B 19/04 | (2006.01) |
| F16B 39/24 | (2006.01) |
| C22F 1/18 | (2006.01) |
| F16B 37/00 | (2006.01) |
| F16B 43/00 | (2006.01) |

(52) U.S. Cl.
CPC .............. *F16B 33/00* (2013.01); *C22C 14/00* (2013.01); *C22F 1/183* (2013.01); *F16B 19/04* (2013.01); *F16B 37/00* (2013.01); *F16B 39/24* (2013.01); *F16B 43/00* (2013.01)

(58) Field of Classification Search
CPC .......... C22C 14/00; C22F 1/183; F16B 19/04; F16B 33/00; F16B 37/00; F16B 39/24; F16B 43/00
See application file for complete search history.

(56) References Cited

U.S. PATENT DOCUMENTS

| | | |
|---|---|---|
| 2,857,269 A | 10/1958 | Vordahl |
| 2,893,864 A | 7/1959 | Harris et al. |
| 2,932,886 A | 4/1960 | Althouse |
| 2,974,076 A | 3/1961 | Vordahl |
| 3,015,292 A | 1/1962 | Bridwell |
| 3,025,905 A | 3/1962 | Haerr |
| 3,060,564 A | 10/1962 | Corral |
| 3,082,083 A | 3/1963 | Levy et al. |
| 3,117,471 A | 1/1964 | O'Connell et al. |
| 3,313,138 A | 4/1967 | Spring et al. |
| 3,379,522 A | 4/1968 | Vordahl |
| 3,436,277 A | 4/1969 | Bomberger, Jr. et al. |
| 3,469,975 A | 9/1969 | Bomberger, Jr. et al. |
| 3,489,617 A | 1/1970 | Wuerfel |
| 3,584,487 A | 6/1971 | Carlson |
| 3,605,477 A | 9/1971 | Carlson |
| 3,615,378 A | 10/1971 | Bomberger, Jr. et al. |
| 3,635,068 A | 1/1972 | Watmough et al. |
| 3,649,259 A | 3/1972 | Heitman |
| 3,676,225 A | 7/1972 | Owczarski et al. |
| 3,686,041 A | 8/1972 | Lee |
| 3,802,877 A | 4/1974 | Parris et al. |
| 3,815,395 A | 6/1974 | Sass |
| 3,835,282 A | 9/1974 | Sass et al. |
| 3,922,899 A | 12/1975 | Fremont et al. |
| 3,979,815 A | 9/1976 | Nakanose et al. |
| 4,053,330 A | 10/1977 | Henricks et al. |
| 4,067,734 A | 1/1978 | Curtis et al. |
| 4,094,708 A | 6/1978 | Hubbard et al. |
| 4,098,623 A | 7/1978 | Ibaraki et al. |
| 4,120,187 A | 10/1978 | Mullen |
| 4,138,141 A | 2/1979 | Andersen |
| 4,147,639 A | 4/1979 | Lee et al. |
| 4,150,279 A | 4/1979 | Metcalfe et al. |
| 4,163,380 A | 8/1979 | Masoner |
| 4,197,643 A | 4/1980 | Burstone et al. |
| 4,229,216 A | 10/1980 | Paton et al. |
| 4,299,626 A | 11/1981 | Paton et al. |

(Continued)

FOREIGN PATENT DOCUMENTS

| | | |
|---|---|---|
| CA | 2787980 A | 7/2011 |
| CN | 1070230 A | 3/1993 |

(Continued)

OTHER PUBLICATIONS

F.J. Gil Formation of alpha-Widmanstatten structure: effects of grain size and cooling rate on the Widmanstatten morphologies and on the mechanical properties in Ti6Al4V alloy 2001, Journal of Alloys and Compounds 329 (2001) 142-152 (Year: 2001).*
Sohrab Enayati "Effects of temperature and effective strain on the flow behavior of Ti—6Al—4V" Journal of Franklin Institute 348 (2011) 2813-2822 (Year: 2011).*
"Allvac TiOsteum and TiOstalloy Beat Titanium Alloys", printed from www.allvac.com/allvac/pages/Titanium/TiOsteum.htm on Nov. 7, 2005.
"Datasheet: Timetal 21S", Alloy Digest, Advanced Materials and Processes (Sep. 1998), pp. 38-39.
"Heat Treating of Nonferrous Alloys: Heat Treating of Titanium and Titanium Alloys," Metals Handbook, ASM Handbooks Online (2002).
"Stryker Orthopaedics TMZF® Alloy (UNS R58120)", printed from www.allvac.com/allvac/pages/Titanium/UNSR58120.htm on Nov. 7, 2005.

(Continued)

*Primary Examiner* — Jenny R Wu
(74) *Attorney, Agent, or Firm* — Robert J. Toth; K&L Gates LLP

(57) ABSTRACT

A method for increasing tensile strength of a cold workable alpha-beta titanium alloy comprises solution heat treating a cold workable alpha-beta titanium alloy in a temperature range of $T_\beta$-106° C. to $T_\beta$-72.2° C. for 15 minutes to 2 hours; cooling the alpha-beta titanium alloy at a cooling rate of at least 3000° C./minute; cold working the alpha-beta titanium alloy to impart an effective strain in the range of 5 percent to 35 percent in the alloy; and aging the alpha-beta titanium alloy in a temperature range of $T_\beta$-669° C. to $T_\beta$-517° C. for 1 to 8 hours. Fastener stock and fasteners including solution treated, quenched, cold worked, and aged alpha-beta titanium alloys are also disclosed.

21 Claims, 6 Drawing Sheets

(56) References Cited

U.S. PATENT DOCUMENTS

| | | |
|---|---|---|
| 4,309,226 A | 1/1982 | Chen |
| 4,472,207 A | 9/1984 | Kinoshita et al. |
| 4,473,125 A | 9/1984 | Addudle et al. |
| 4,482,398 A | 11/1984 | Eylon et al. |
| 4,510,788 A | 4/1985 | Ferguson et al. |
| 4,543,132 A | 9/1985 | Berczik et al. |
| 4,614,550 A | 9/1986 | Leonard et al. |
| 4,631,092 A | 12/1986 | Ruckle et al. |
| 4,639,281 A | 1/1987 | Sastry et al. |
| 4,668,290 A | 5/1987 | Wang et al. |
| 4,687,290 A | 8/1987 | Prussas |
| 4,688,290 A | 8/1987 | Hogg |
| 4,690,716 A | 9/1987 | Sabol et al. |
| 4,714,468 A | 12/1987 | Wang et al. |
| 4,798,632 A | 1/1989 | Yonezawa et al. |
| 4,799,975 A | 1/1989 | Ouchi et al. |
| 4,808,249 A | 2/1989 | Eyelon et al. |
| 4,842,653 A | 6/1989 | Wirth et al. |
| 4,851,055 A | 7/1989 | Eylon et al. |
| 4,854,977 A | 8/1989 | Alheritiere et al. |
| 4,857,269 A | 8/1989 | Wang et al. |
| 4,878,966 A | 11/1989 | Alheritiere et al. |
| 4,888,973 A | 12/1989 | Comley |
| 4,889,170 A | 12/1989 | Mae et al. |
| 4,917,728 A | 4/1990 | Enright |
| 4,919,728 A | 4/1990 | Kohl et al. |
| 4,943,412 A | 7/1990 | Bania et al. |
| 4,957,567 A | 9/1990 | Krueger et al. |
| 4,975,125 A | 12/1990 | Chakrabarti et al. |
| 4,980,127 A | 12/1990 | Parris et al. |
| 5,026,520 A | 6/1991 | Bhowal et al. |
| 5,032,189 A | 7/1991 | Eylon et al. |
| 5,041,262 A | 8/1991 | Gigliotti, Jr. |
| 5,074,907 A | 12/1991 | Amato et al. |
| 5,080,727 A | 1/1992 | Aihara et al. |
| 5,094,812 A | 3/1992 | Dulmaine et al. |
| 5,141,566 A | 8/1992 | Kitayama et al. |
| 5,156,807 A | 10/1992 | Nagata et al. |
| 5,162,159 A | 11/1992 | Tenhover et al. |
| 5,169,597 A | 12/1992 | Davidson et al. |
| 5,173,134 A | 12/1992 | Chakrabarti et al. |
| 5,201,457 A | 4/1993 | Kitayama et al. |
| 5,244,517 A | 9/1993 | Kimura et al. |
| 5,256,369 A | 10/1993 | Ogawa et al. |
| 5,264,055 A | 11/1993 | Champin et al. |
| 5,277,718 A | 1/1994 | Paxson et al. |
| 5,310,522 A | 5/1994 | Culling |
| 5,330,591 A | 7/1994 | Vasseur |
| 5,332,454 A | 7/1994 | Meredith et al. |
| 5,332,545 A | 7/1994 | Love |
| 5,342,458 A | 8/1994 | Adams et al. |
| 5,358,586 A | 10/1994 | Schutz |
| 5,359,872 A | 11/1994 | Nashiki |
| 5,360,496 A | 11/1994 | Kuhlman et al. |
| 5,374,323 A | 12/1994 | Kuhlman et al. |
| 5,399,212 A | 3/1995 | Chakrabarti et al. |
| 5,442,847 A | 8/1995 | Semiatin et al. |
| 5,472,526 A | 12/1995 | Gigliotti, Jr. |
| 5,494,636 A | 2/1996 | Dupioron et al. |
| 5,509,979 A | 4/1996 | Kimura |
| 5,516,375 A | 5/1996 | Ogawa et al. |
| 5,520,879 A | 5/1996 | Saito et al. |
| 5,527,403 A | 6/1996 | Schirra et al. |
| 5,545,262 A | 8/1996 | Hardee et al. |
| 5,545,268 A | 8/1996 | Yashiki et al. |
| 5,547,523 A | 8/1996 | Blankenship et al. |
| 5,558,728 A | 9/1996 | Kobayashi et al. |
| 5,580,665 A | 12/1996 | Taguchi et al. |
| 5,600,989 A | 2/1997 | Segal et al. |
| 5,649,280 A | 7/1997 | Blankenship et al. |
| 5,658,403 A | 8/1997 | Kimura |
| 5,662,745 A | 9/1997 | Takayama et al. |
| 5,679,183 A | 10/1997 | Takagi et al. |
| 5,698,050 A | 12/1997 | El-Soudani |
| 5,758,420 A | 6/1998 | Schmidt et al. |
| 5,759,305 A | 6/1998 | Benz et al. |
| 5,759,484 A | 6/1998 | Kashii et al. |
| 5,795,413 A | 8/1998 | Gorman |
| 5,871,595 A | 2/1999 | Ahmed et al. |
| 5,896,643 A | 4/1999 | Tanaka |
| 5,897,830 A | 4/1999 | Abkowitz et al. |
| 5,904,204 A | 5/1999 | Teraoka et al. |
| 5,954,724 A | 9/1999 | Davidson |
| 5,980,655 A | 11/1999 | Kosaka |
| 6,002,118 A | 12/1999 | Kawano et al. |
| 6,032,508 A | 3/2000 | Ashworth et al. |
| 6,044,685 A | 4/2000 | Delgado et al. |
| 6,053,993 A | 4/2000 | Reichman et al. |
| 6,059,904 A | 5/2000 | Benz et al. |
| 6,071,360 A | 6/2000 | Gillespie |
| 6,077,369 A | 6/2000 | Kusano et al. |
| 6,127,044 A | 10/2000 | Yamamoto et al. |
| 6,132,526 A | 10/2000 | Carisey et al. |
| 6,139,659 A | 10/2000 | Takahashi et al. |
| 6,143,241 A | 11/2000 | Hajaligol et al. |
| 6,187,045 B1 | 2/2001 | Fehring et al. |
| 6,197,129 B1 | 3/2001 | Zhu et al. |
| 6,200,685 B1 | 3/2001 | Davidson |
| 6,209,379 B1 | 4/2001 | Nishida et al. |
| 6,216,508 B1 | 4/2001 | Matsubara et al. |
| 6,228,189 B1 | 5/2001 | Oyama et al. |
| 6,250,812 B1 | 6/2001 | Ueda et al. |
| 6,258,182 B1 | 7/2001 | Schetky et al. |
| 6,284,071 B1 | 9/2001 | Suzuki et al. |
| 6,332,935 B1 | 12/2001 | Gorman et al. |
| 6,334,350 B1 | 1/2002 | Shin et al. |
| 6,334,912 B1 | 1/2002 | Ganin et al. |
| 6,384,388 B1 | 5/2002 | Anderson et al. |
| 6,387,197 B1 | 5/2002 | Bewlay et al. |
| 6,391,128 B2 | 5/2002 | Ueda et al. |
| 6,399,215 B1 | 6/2002 | Zhu et al. |
| 6,402,859 B1 | 6/2002 | Ishii et al. |
| 6,409,852 B1 | 6/2002 | Lin et al. |
| 6,532,786 B1 | 3/2003 | Luttgeharm |
| 6,536,110 B2 | 3/2003 | Smith et al. |
| 6,539,607 B1 | 4/2003 | Fehring et al. |
| 6,539,765 B2 | 4/2003 | Gates |
| 6,558,273 B2 | 5/2003 | Kobayashi et al. |
| 6,561,002 B2 | 5/2003 | Okada et al. |
| 6,569,270 B2 | 5/2003 | Segal |
| 6,576,068 B2 | 6/2003 | Grubb et al. |
| 6,632,304 B2 | 10/2003 | Oyama et al. |
| 6,632,396 B1 | 10/2003 | Tetjukhin et al. |
| 6,663,501 B2 | 12/2003 | Chen |
| 6,726,784 B2 | 4/2004 | Oyama et al. |
| 6,742,239 B2 | 6/2004 | Lee et al. |
| 6,764,647 B2 | 7/2004 | Aigner et al. |
| 6,773,520 B1 | 8/2004 | Fehring et al. |
| 6,786,985 B2 | 9/2004 | Kosaka et al. |
| 6,800,153 B2 | 10/2004 | Ishii et al. |
| 6,823,705 B2 | 11/2004 | Fukada et al. |
| 6,908,517 B2 | 6/2005 | Segal et al. |
| 6,918,971 B2 | 7/2005 | Fujii et al. |
| 6,932,877 B2 | 8/2005 | Raymond et al. |
| 6,939,415 B2 | 9/2005 | Iseda et al. |
| 6,971,256 B2 | 12/2005 | Okada et al. |
| 7,008,491 B2 | 3/2006 | Woodfield |
| 7,010,950 B2 | 3/2006 | Cai et al. |
| 7,032,426 B2 | 4/2006 | Durney et al. |
| 7,037,389 B2 | 5/2006 | Barbier et al. |
| 7,038,426 B2 | 5/2006 | Hill |
| 7,081,173 B2 | 7/2006 | Bahar et al. |
| 7,096,596 B2 | 8/2006 | Hernandez, Jr. et al. |
| 7,132,021 B2 | 11/2006 | Kuroda et al. |
| 7,152,449 B2 | 12/2006 | Durney et al. |
| 7,264,682 B2 | 9/2007 | Chandran et al. |
| 7,269,986 B2 | 9/2007 | Pfaffmann et al. |
| 7,332,043 B2 | 2/2008 | Tetyukhin et al. |
| 7,410,610 B2 | 8/2008 | Woodfield et al. |
| 7,438,849 B2 | 10/2008 | Kuramoto et al. |
| 7,449,075 B2 | 11/2008 | Woodfield et al. |
| 7,536,892 B2 | 5/2009 | Amino et al. |
| 7,559,221 B2 | 7/2009 | Horita et al. |
| 7,601,232 B2 | 10/2009 | Fonte |

(56) References Cited

U.S. PATENT DOCUMENTS

| | | |
|---|---|---|
| 7,611,592 B2 | 11/2009 | Davis et al. |
| 7,708,841 B2 | 5/2010 | Saller et al. |
| 7,837,812 B2 | 11/2010 | Marquardt et al. |
| 7,879,286 B2 | 2/2011 | Miracle et al. |
| 7,947,136 B2 | 5/2011 | Saller |
| 7,984,635 B2 | 7/2011 | Callebaut et al. |
| 8,037,730 B2 | 10/2011 | Polen et al. |
| 8,043,446 B2 | 10/2011 | Jung et al. |
| 8,048,240 B2 | 11/2011 | Hebda et al. |
| 8,128,764 B2 | 3/2012 | Miracle et al. |
| 8,211,548 B2 | 7/2012 | Chun et al. |
| 8,316,687 B2 | 11/2012 | Slattery |
| 8,336,359 B2 | 12/2012 | Werz |
| 8,408,039 B2 | 4/2013 | Cao et al. |
| 8,430,075 B2 | 4/2013 | Qiao et al. |
| 8,454,765 B2 | 6/2013 | Saller et al. |
| 8,499,605 B2 | 8/2013 | Bryan |
| 8,568,540 B2 | 10/2013 | Marquardt et al. |
| 8,578,748 B2 | 11/2013 | Huskamp et al. |
| 8,597,442 B2 | 12/2013 | Hebda et al. |
| 8,597,443 B2 | 12/2013 | Hebda et al. |
| 8,608,913 B2 | 12/2013 | Shim et al. |
| 8,613,818 B2 | 12/2013 | Forbes Jones et al. |
| 8,623,155 B2 | 1/2014 | Marquardt et al. |
| 8,652,400 B2 | 2/2014 | Forbes Jones et al. |
| 8,679,269 B2 | 3/2014 | Goller et al. |
| 8,834,653 B2 | 9/2014 | Bryan |
| 8,919,168 B2 | 12/2014 | Valiev et al. |
| 9,034,247 B2 | 5/2015 | Suzuki et al. |
| 9,050,647 B2 | 6/2015 | Thomas et al. |
| 9,192,981 B2 | 11/2015 | Forbes Jones et al. |
| 9,206,497 B2 | 12/2015 | Bryan et al. |
| 9,255,316 B2 | 2/2016 | Bryan |
| 9,327,342 B2 | 5/2016 | Oppenheimer et al. |
| 9,765,420 B2 * | 9/2017 | Bryan .................. C22F 1/183 |
| 2002/0033717 A1 | 3/2002 | Matsuo |
| 2003/0168138 A1* | 9/2003 | Marquardt .............. C22C 14/00 148/671 |
| 2004/0099350 A1 | 5/2004 | Manitone et al. |
| 2004/0148997 A1 | 8/2004 | Amino et al. |
| 2004/0221929 A1* | 11/2004 | Hebda .................. C22C 14/00 148/670 |
| 2004/0250932 A1 | 12/2004 | Briggs |
| 2005/0047952 A1 | 3/2005 | Coleman |
| 2005/0145310 A1 | 7/2005 | Bewlay et al. |
| 2006/0045789 A1 | 3/2006 | Nasserrafi et al. |
| 2006/0110614 A1 | 5/2006 | Liimatainen |
| 2006/0243356 A1 | 11/2006 | Oikawa et al. |
| 2007/0017273 A1 | 1/2007 | Haug et al. |
| 2007/0098588 A1 | 5/2007 | Narita et al. |
| 2007/0193018 A1* | 8/2007 | Davis .................. B21B 1/46 29/527.7 |
| 2007/0193662 A1 | 8/2007 | Jablokov et al. |
| 2007/0286761 A1 | 12/2007 | Miracle et al. |
| 2008/0000554 A1 | 1/2008 | Yaguchi et al. |
| 2008/0103543 A1 | 5/2008 | Li et al. |
| 2008/0107559 A1 | 5/2008 | Nishiyama et al. |
| 2008/0202189 A1 | 8/2008 | Otaki |
| 2008/0210345 A1 | 9/2008 | Tetyukhin et al. |
| 2008/0264932 A1 | 10/2008 | Hirota |
| 2009/0000706 A1 | 1/2009 | Huron et al. |
| 2009/0183804 A1 | 7/2009 | Zhao et al. |
| 2009/0234385 A1 | 9/2009 | Cichocki et al. |
| 2011/0180188 A1 | 7/2011 | Bryan et al. |
| 2011/0183151 A1 | 7/2011 | Yokoyama et al. |
| 2012/0067100 A1 | 3/2012 | Stefansson et al. |
| 2012/0076611 A1 | 3/2012 | Bryan |
| 2012/0076612 A1 | 3/2012 | Bryan |
| 2012/0076686 A1 | 3/2012 | Bryan |
| 2012/0279351 A1 | 11/2012 | Gu et al. |
| 2013/0000799 A1* | 1/2013 | Kosaka .................. C22F 1/18 148/670 |
| 2013/0062003 A1 | 3/2013 | Shulkin et al. |
| 2013/0156628 A1 | 6/2013 | Forbes Jones et al. |
| 2014/0060138 A1 | 3/2014 | Hebda et al. |
| 2014/0076468 A1 | 3/2014 | Marquardt et al. |
| 2014/0076471 A1 | 3/2014 | Forbes Jones et al. |
| 2014/0116581 A1* | 5/2014 | Sanz .................. C22C 14/00 148/669 |
| 2014/0116582 A1 | 5/2014 | Forbes Jones et al. |
| 2014/0238552 A1 | 8/2014 | Forbes Jones et al. |
| 2014/0261922 A1 | 9/2014 | Thomas et al. |
| 2015/0129093 A1 | 5/2015 | Forbes Jones et al. |
| 2016/0047024 A1 | 2/2016 | Bryan |
| 2016/0122851 A1 | 5/2016 | Jones et al. |
| 2016/0138149 A1 | 5/2016 | Bryan |
| 2016/0201165 A1 | 7/2016 | Foltz, IV |
| 2017/0058387 A1 | 3/2017 | Marquardt et al. |
| 2017/0218485 A1 | 8/2017 | Jones et al. |
| 2017/0349977 A1 | 12/2017 | Forbes Jones et al. |
| 2018/0195155 A1 | 7/2018 | Bryan |

FOREIGN PATENT DOCUMENTS

| | | |
|---|---|---|
| CN | 1194671 A | 9/1998 |
| CN | 1403622 | 3/2003 |
| CN | 1816641 A | 8/2006 |
| CN | 101104898 A | 1/2008 |
| CN | 101205593 A | 6/2008 |
| CN | 101294264 A | 10/2008 |
| CN | 101684530 A | 3/2010 |
| CN | 101637789 B | 6/2011 |
| CN | 102212716 A | 10/2011 |
| CN | 102816953 A | 12/2012 |
| DE | 19743802 A1 | 3/1999 |
| DE | 10128199 A1 | 12/2002 |
| DE | 102010009185 A1 | 11/2011 |
| EP | 0066361 A2 | 12/1982 |
| EP | 0109350 A2 | 5/1984 |
| EP | 0320820 A1 | 6/1989 |
| EP | 0535817 B1 | 4/1995 |
| EP | 0611831 B1 | 1/1997 |
| EP | 0834580 A1 | 4/1998 |
| EP | 0870845 A1 | 10/1998 |
| EP | 0707085 B1 | 1/1999 |
| EP | 0683242 B1 | 5/1999 |
| EP | 0969109 A1 | 1/2000 |
| EP | 1083243 A2 | 3/2001 |
| EP | 1136582 A1 | 9/2001 |
| EP | 1302554 A1 | 4/2003 |
| EP | 1302555 A1 | 4/2003 |
| EP | 1433863 | 6/2004 |
| EP | 1471158 A1 | 10/2004 |
| EP | 1605073 A1 | 12/2005 |
| EP | 1612289 A2 | 1/2006 |
| EP | 1375690 B1 | 3/2006 |
| EP | 1717330 A1 | 11/2006 |
| EP | 1882752 A2 | 1/2008 |
| EP | 2028435 A1 | 2/2009 |
| EP | 2281908 A1 | 2/2011 |
| EP | 1546429 B1 | 6/2012 |
| FR | 2545104 A1 | 11/1984 |
| GB | 847103 | 9/1960 |
| GB | 1170997 A | 11/1969 |
| GB | 1433306 | 4/1976 |
| GB | 2151260 A | 7/1985 |
| GB | 2337762 A | 12/1999 |
| JP | 55-113865 A | 9/1980 |
| JP | 57-62820 A | 4/1982 |
| JP | 57-62846 A | 4/1982 |
| JP | S58-210158 A | 12/1983 |
| JP | 60-046358 | 3/1985 |
| JP | 60-100655 A | 6/1985 |
| JP | S61-060871 | 3/1986 |
| JP | S61-217564 A | 9/1986 |
| JP | S61-270356 A | 11/1986 |
| JP | 62-109956 A | 5/1987 |
| JP | 62-127074 A | 6/1987 |
| JP | 62-149859 A | 7/1987 |
| JP | S62-227597 A | 10/1987 |
| JP | S62-247023 A | 10/1987 |
| JP | S63-49302 A | 3/1988 |
| JP | S63-188426 A | 8/1988 |
| JP | H01-272750 A | 10/1989 |

(56) References Cited

FOREIGN PATENT DOCUMENTS

| | | |
|---|---|---|
| JP | 1-279736 A | 11/1989 |
| JP | 2-205661 A | 8/1990 |
| JP | 3-134124 A | 6/1991 |
| JP | H03-138343 A | 6/1991 |
| JP | H03-166350 A | 7/1991 |
| JP | H03-264618 A | 11/1991 |
| JP | 4-74856 A | 3/1992 |
| JP | 4-103737 A | 4/1992 |
| JP | 4-143236 A | 5/1992 |
| JP | 4-168227 A | 6/1992 |
| JP | 5-59510 A | 3/1993 |
| JP | 5-117791 A | 5/1993 |
| JP | 5-195175 A | 8/1993 |
| JP | H05-293555 A | 11/1993 |
| JP | H06-93389 A | 4/1994 |
| JP | 8-300044 A | 11/1996 |
| JP | 9-143650 | 6/1997 |
| JP | 9-194969 A | 7/1997 |
| JP | 9-215786 A | 8/1997 |
| JP | H10-128459 A | 5/1998 |
| JP | H10-306335 A | 11/1998 |
| JP | H11-21642 A | 1/1999 |
| JP | H11-309521 A | 11/1999 |
| JP | H11-319958 A | 11/1999 |
| JP | 11-343528 A | 12/1999 |
| JP | 11-343548 A | 12/1999 |
| JP | 2000-153372 A | 6/2000 |
| JP | 2000-234887 A | 8/2000 |
| JP | 2001-71037 A | 3/2001 |
| JP | 2001-081537 A | 3/2001 |
| JP | 2001-343472 A | 12/2001 |
| JP | 2002-69591 A | 3/2002 |
| JP | 2002-146497 A | 5/2002 |
| JP | 2003-55749 A | 2/2003 |
| JP | 2003-74566 A | 3/2003 |
| JP | 2003-285126 A | 10/2003 |
| JP | 2003-334633 A | 11/2003 |
| JP | 2004-131761 | 4/2004 |
| JP | 2005-281855 A | 10/2005 |
| JP | 2007-291488 A | 11/2007 |
| JP | 2007-327118 A | 12/2007 |
| JP | 2008-200730 A | 9/2008 |
| JP | 2009-138218 A | 6/2009 |
| JP | WO 2009/142228 A1 | 11/2009 |
| JP | 2009-299110 A | 12/2009 |
| JP | 2009-299120 A | 12/2009 |
| JP | 2010-70833 A | 4/2010 |
| JP | 2012-140690 A | 7/2012 |
| JP | 2015-54332 A | 3/2015 |
| KR | 920004946 | 6/1992 |
| KR | 10-2005-0087765 A | 8/2005 |
| KR | 10-2009-0069647 A | 7/2009 |
| RU | 2003417 C1 | 11/1993 |
| RU | 1131234 C | 10/1994 |
| RU | 2156828 C1 | 9/2000 |
| RU | 2197555 C1 | 7/2001 |
| RU | 2172359 C1 | 8/2001 |
| RU | 2217260 C1 | 11/2003 |
| RU | 2234998 C1 | 8/2004 |
| RU | 2269584 C1 | 2/2006 |
| RU | 2288967 C1 | 12/2006 |
| RU | 2364660 C1 | 8/2009 |
| RU | 2368695 C1 | 9/2009 |
| RU | 2378410 C1 | 1/2010 |
| RU | 2392348 C2 | 6/2010 |
| RU | 2393936 C1 | 7/2010 |
| RU | 2441089 C1 | 1/2012 |
| SU | 534518 A1 | 1/1977 |
| SU | 631234 A | 11/1978 |
| SU | 1077328 A | 5/1982 |
| SU | 1135798 A1 | 1/1985 |
| SU | 1088397 A1 | 2/1991 |
| UA | 38805 A | 5/2001 |
| UA | 40862 A | 8/2001 |
| UA | A200613448 | 6/2008 |
| WO | WO 98/17836 A1 | 4/1998 |
| WO | WO 98/22629 A | 5/1998 |
| WO | WO 02/36847 A2 | 5/2002 |
| WO | WO 02/070763 A1 | 9/2002 |
| WO | WO 02/086172 A1 | 10/2002 |
| WO | WO 02/090607 A1 | 11/2002 |
| WO | WO 2004/101838 A1 | 11/2004 |
| WO | WO 2007/084178 A2 | 7/2007 |
| WO | WO 2007/114439 A1 | 10/2007 |
| WO | WO 2007/142379 A1 | 12/2007 |
| WO | WO 2008/017257 A1 | 2/2008 |
| WO | WO 2009/082498 A1 | 7/2009 |
| WO | WO 2010/084883 A1 | 7/2010 |
| WO | WO 2012/063504 A1 | 5/2012 |
| WO | WO 2012/147742 A1 | 11/2012 |
| WO | WO 2013/081770 A1 | 6/2013 |
| WO | WO 2013/130139 A2 | 9/2013 |

OTHER PUBLICATIONS

"Technical Data Sheet: Allvac® Ti—15Mo Beta Titanium Alloy" (dated Jun. 16, 2004).

ASM Materials Engineering Dictionary, "Blasting or Blast Cleaning," J.R. Davis Ed., ASM International, Materials Park, OH (1992) p. 42.

"ASTM Designation F1801-97 Standard Practice for Corrosion Fatigue Testing of Metallic Implant Materials" ASTM International (1997) pp. 876-880.

"ASTM Designation F2066-01 Standard Specification for Wrought Titanium-15 Molybdenum Alloy for Surgical Implant Applications (UNS R58150)," ASTM International (2000) pp. 1-4.

AL-6XN® Alloy (UNS N08367) Allegheny Ludlum Corporation, 2002, 56 pages.

Allegheny Ludlum, "High Performance Metals for Industry, High Strength, High Temperature, and Corrosion-Resistant Alloys", (2000) pp. 1-8.

Allvac, Product Specification for "Allvac Ti—15 Mo," available at http://www.allvac.com/allvac/pages/Titanium/Ti15MO.htm, last visited Jun. 9, 2003 p. 1 of 1.

Altemp® A286 Iron-Base Superalloy (UNS Designation S66286) Allegheny Ludlum Technical Data Sheet Blue Sheet, 1998, 8 pages.

ASM Materials Engineering Dictionary, J.R. Davis Ed., ASM International, Materials Park, OH (1992) p. 39.

ATI Datalloy 2 Alloy, Technical Data Sheet, ATI Allvac, Monroe, NC, SS-844, Version1, Sep. 17, 2010, 8 pages.

ATI 38-644™ Beta Titanium Alloy Technical Data Sheet, UNS R58640, Version 1, Dec. 21, 2011, 4 pages.

ATI 690 (UNS N06690) Nickel-Base, ATI Allvac, Oct. 5, 2010, 1 page.

Isothermal forging definition, ASM Materials Engineering Dictionary, J.R. Davis ed., Fifth Printing, Jan. 2006, ASM International, p. 238.

Isothermal forging, printed from http://thelibraryofmanufacturing.com/isothermal_forging.html, accessed Jun. 5, 2013, 3 pages.

Adiabatic definition, ASM Materials Engineering Dictionary, J.R. Davis ed., Fifth Printing, Jan. 2006, ASM International, p. 9.

Adiabatic process—Wikipedia, the free encyclopedia, printed from http://en.wikipedia.org/wiki/Adiabatic_process, accessed May 21, 2013, 10 pages.

ASTM Designation F 2066-01, "Standard Specification for Wrought Titanium-15 Molybdenum Alloy for Surgical Implant Applications (UNS R58150)", May 2001, 7 pages.

ASTM Designation F 2066/F2066M-13, "Standard Specification for Wrought Titanium-15 Molybdenum Alloy for Surgical Implant Applications (UNS R58150)", Nov. 2013, 6 pages.

ATI 6-2-4-2™ Alloy Technical Data Sheet, Version 1, Feb. 26, 2012, 4 pages.

ATI 6-2-4-6™ Titanium Alloy Data Sheet, accessed Jun. 26, 2012.

ATI 425, High-Strength Titanium Alloy, Alloy Digest, ASM International, Jul. 2004, 2 pages.

ATI 425® Alloy Applications, retrieved from http://web.archive.org/web/20100704044024/http://www.alleghenytechnologies.com/ATI425/applications/default.asp#other, Jul. 4, 2010, Way Back Machine, 2 pages.

(56) References Cited

OTHER PUBLICATIONS

ATI 425® Alloy, Technical Data Sheet, retrieved from http://web.archive.org/web/20100703120218/http://www.alleghenytechnologies.com/ATI425/specifications/datasheet.asp, Jul. 3, 2010, Way Back Machine, 5 pages.
ATI 425®-MIL Alloy, Technical Data Sheet, Version 1, May 28, 2010, pp. 1-5.
ATI 425®-MIL Alloy, Technical Data Sheet, Version 2, Aug. 16, 2010, 5 pages.
ATI 425®-MIL Titanium Alloy, Mission Critical Metallics®, Version 3, Sep. 10, 2009, pp. 1-4.
ATI 425® Titanium Alloy, Grade 38 Technical Data Sheet, Version 1, Feb. 1, 2012, pp. 1-6.
ATI 425® Alloy, Grade 38, Titanium Alloy, UNS R54250, Technical Data Sheet, Version 1, Nov. 25, 2013, pp. 1-6.
ATI 500-MIL™, Mission Critical Metallics®, High Hard Specialty Steel Armor, Version 4, Sep. 10, 2009, pp. 1-4.
ATI 600-MIL®, Preliminary Draft Data Sheet, Ultra High Hard Specialty Steel Armor, Version 4, Aug. 10, 2010, pp. 1-3.
ATI 600-MIL™, Preliminary Draft Data Sheet, Ultra High Hard Specialty Steel Armor, Version 3, Sep. 10, 2009, pp. 1-3.
ATI Aerospace Materials Development, Mission Critical Metallics, Apr. 30, 2008, 17 pages.
ATI Ti—15Mo Beta Titanium Alloy Technical Data Sheet, ATI Allvac, Monroe, NC, Mar. 21, 2008, 3 pages.
ATI Titanium 6Al—2Sn—4Zr—2Mo Alloy, Technical Data Sheet, Version 1, Sep. 17, 2010, pp. 1-3.
ATI Titanium 6Al—4V Alloy, Mission Critical Metallics®, Technical Data Sheet, Version 1, Apr. 22, 2010, pp. 1-3.
ATI Wah Chang, ATI™ 425 Titanium Alloy (Ti—4Al—2.5V—1.5Fe-0.2502), Technical Data Sheet, 2004, pp. 1-5.
ATI Wah Chang, Titanium and Titanium Alloys, Technical Data Sheet, 2003, pp. 1-16.
Beal et al., "Forming of Titanium and Titanium Alloys—Cold Forming", ASM Handbook, 2006, ASM International, vol. 14B, 2 pages.
Beal et al., "Forming of Titanium and Titanium Alloys—Cold Forming", ASM Handbook, 2006, ASM International, Revised by ASM Committee on Forming Titanium Alloys, vol. 14B, 2 pages.
Beal et al., "Forming of Titanium and Titanium Alloys—Cold Forming", ASM Handbook, 2006, vol. 14B, pp. 656-669.
Bewlay, et al., "Superplastic roll forming of Ti alloys", Materials and Design, 21, 2000, pp. 287-295.
Bowen, A. W., "Omega Phase Embrittlement in Aged Ti—15% Mo," Scripta Metallurgica, vol. 5, No. 8 (1971) pp. 709-715.
Bowen, A. W., "On the Strengthening of a Metastable b-Titanium Alloy by w- and a-Precipitation" Royal Aircraft Establishment Technical Memorandum Mat 338, (1980) pp. 1-15 and Figs 1-5.
Boyer, Rodney R., "Introduction and Overview of Titanium and Titanium Alloys: Applications," Metals Handbook, ASM Handbooks Online (2002).
Boyko et al., "Modeling of the Open-Die and Radial Forging Processes for Alloy 718", Superalloys 718, 625 and Various Derivatives: Proceedings of the International Symposium on the Metallurgy and Applications of Superalloys 718, 625 and Various Derivatives, held Jun. 23, 1992, pp. 107-124.
Cain, Patrick, "Warm forming aluminum magnesium components; How it can optimize formability, reduce springback", Aug. 1, 2009, from http://www.thefabricator.com/article/presstechnology/warm-forming-aluminum-magnesium-components, 3 pages.
Callister, Jr., William D., Materials Science and Engineering, An Introduction, Sixth Edition, John Wiley & Sons, pp. 180-184 (2003).
Craighead et al., "Ternary Alloys of Titanium", Journal of Metals, Mar. 1950, Transactions AIME, vol. 188, pp. 514-538.
Craighead et al., "Titanium Binary Alloys", Journal of Metals, Mar. 1950, Transactions AIME, vol. 188, pp. 485-513.

Desrayaud et al., "A novel high straining process for bulk materials—The development of a multipass forging system by compression along three axes", Journal of Materials Processing Technology, 172, 2006, pp. 152-158.
Diderrich et al., "Addition of Cobalt to the Ti—6Al—4V Alloy", Journal of Metals, May 1968, pp. 29-37.
DiDomizio, et al., "Evaluation of a Ni—20Cr Alloy Processed by Multi-axis Forging", Materials Science Forum vols. 503-504, 2006, pp. 793-798.
Disegi, J. A., "Titanium Alloys for Fracture Fixation Implants," Injury International Journal of the Care of the Injured, vol. 31 (2000) pp. S-D14-17.
Disegi, John, Wrought Titanium-15% Molybdenum Implant Material, Original Instruments and Implants of the Association for the Study of International Fixation—AO ASIF, Oct. 2003.
Donachie Jr., M.J., "Titanium A Technical Guide" 1988, ASM, pp. 39 and 46-50.
Donachie Jr., M.J., "Heat Treating Titanium and Its Alloys", Heat Treating Process, Jun./Jul. 2001, pp. 47-49, 52-53, and 56-57.
Duflou et al., "A method for force reduction in heavy duty bending", Int. J. Materials and Product Technology, vol. 32, No. 4, 2008, pp. 460-475.
Elements of Metallurgy and Engineering Alloys, Editor F. C. Campbell, ASM International, 2008, Chapter 8, p. 125.
Fedotov, S.G. et al., "Effect of Aluminum and Oxygen on the Formation of Metastable Phases in Alloys of Titanium with .beta.-Stabilizing Elements", Izvestiya Akademii Nauk SSSR, Metally (1974) pp. 121-126.
Froes, F.H. et al., "The Processing Window for Grain Size Control in Metastable Beta Titanium Alloys", Beta Titanium Alloys in the 80's, ed. by R. Boyer and H. Rosenberg, AIME, 1984, pp. 161-164.
Gigliotti et al., "Evaluation of Superplastically Roll Formed VT-25", Titamium'99, Science and Technology, 2000, pp. 1581-1588.
Gilbert et al., "Heat Treating of Titanium and Titanium Alloys—Solution Treating and Aging", ASM Handbook, 1991, ASM International, vol. 4, pp. 1-8.
Glazunov et al., Structural Titanium Alloys, Moscow, Metallurgy, 1974, pp. 264-283.
Greenfield, Dan L., News Release, ATI Aerospace Presents Results of Year-Long Characterization Program for New ATI 425 Alloy Titanium Products at Aeromat 2010, Jun. 21, 2010, Pittsburgh, Pennsylvania, 1 page.
Harper, Megan Lynn, "A Study of the Microstructural and Phase Evolutions in Timetal 555", Jan. 2004, retrieved from http://www.ohiolink.edu/etd/send-pdf.cgi/harper%20megan%20lynn.pdf?acc_num=osu1132165471 on Aug. 10, 2009, 92 pages.
Hawkins, M.J. et al., "Osseointegration of a New Beta Titanium Alloy as Compared to Standard Orthopaedic Implant Metals," Sixth World Biomaterials Congress Transactions, Society for Biomaterials, 2000, p. 1083.
Ho, W.F. et al., "Structure and Properties of Cast Binary Ti—Mo Alloys" Biomaterials, vol. 20 (1999) pp. 2115-2122.
Hsieh, Chih-Chun and Weite Wu, "Overview of Intermetallic Sigma Phase Precipitation in Stainless Steels", ISRN Metallurgy, vol. 2012, 2012, pp. 1-16.
Imatani et al., "Experiment and simulation for thick-plate bending by high frequency inductor", ACTA Metallurgica Sinica, vol. 11, No. 6, Dec. 1998, pp. 449-455.
Imayev et al., "Formation of submicrocrystalline structure in TiAl intermetallic compound", Journal of Materials Science, 27, 1992, pp. 4465-4471.
Imayev et al., "Principles of Fabrication of Bulk Ultrafine-Grained and Nanostructured Materials by Multiple Isothermal Forging", Materials Science Forum, vols. 638-642, 2010, pp. 1702-1707.
Imperial Metal Industries Limited, Product Specification for "IMI Titanium 205", The Kynoch Press (England) pp. 1-5. (1965).
Jablokov et al., "Influence of Oxygen Content on the Mechanical Properties of Titanium-35Niobium-7Zirconium-5Tantalum Beta Titanium Alloy," Journal of ASTM International, Sep. 2005, vol. 2, No. 8, 2002, pp. 1-12.

(56) References Cited

OTHER PUBLICATIONS

Jablokov et al., "The Application of Ti—15 Mo Beta Titanium Alloy in High Strength Orthopaedic Applications", Journal of ASTM International, vol. 2, Issue 8 (Sep. 2005) (published online Jun. 22, 2005).

Kovtun, et al., "Method of calculating induction heating of steel sheets during thermomechanical bending", Kiev, Nikolaev, translated from Problemy Prochnosti, No. 5, pp. 105-110, May 1978, original article submitted Nov. 27, 1977, pp. 600-606.

Lampman, S., "Wrought and Titanium Alloys," ASM Handbooks Online, ASM International, 2002.

Lee et al., "An electromagnetic and thermo-mechanical analysis of high frequency induction heating for steel plate bending", Key Engineering Materials, vols. 326-328, 2006, pp. 1283-1286.

Lemons, Jack et al., "Metallic Biomaterials for Surgical Implant Devices," BONEZone, Fall (2002) p. 5-9 and Table.

Long, M. et al., "Friction and Surface Behavior of Selected Titanium Alloys During Reciprocating-Sliding Motion", Wear, 249(1-2), Jan. 17, 2001, 158-168.

Lütjering, G. and J.C. Williams, Titanium, Springer, New York (2nd ed. 2007) p. 24.

Lutjering, G. and Williams, J.C., Titanium, Springer-Verlag, 2003, Ch. 5: Alpha+Beta Alloys, p. 177-201.

Marquardt et al., "Beta Titanium Alloy Processed for High Strength Orthopaedic Applications," Journal of ASTM International, vol. 2, Issue 9 (Oct. 2005) (published online Aug. 17, 2005).

Marquardt, Brian, "Characterization of T—15Mo for Orthopaedic Applications," TMS 2005 Annual Meeting: Technical Program, San Francisco, CA, Feb. 13-17, 2005 Abstract, p. 239.

Marquardt, Brian, "Ti—15Mo Beta Titanium Alloy Processed for High Strength Orthopaedic Applications," Program and Abstracts for The Symposium on Titanium, Niobium, Zirconium, and Tantalum for Medical and Surgical Applications, Washington, D.C., Nov. 9-10, 2004 Abstract, p. 11.

Marte et al., "Structure and Properties of Ni—2OCR Produced by Severe Plastic Deformation", Ultrafine Grained Materials IV, 2006, pp. 419-424.

Materials Properties Handbook: Titanium Alloys, Eds. Boyer et al, ASM International, Materials Park, OH, 1994, pp. 524-525.

Martinelli, Gianni and Roberto Peroni, "Isothermal forging of Ti-alloys for medical applications", Presented at the 11th World Conference on Titanium, Kyoto, Japan, Jun. 4-7, 2007, accessed Jun. 5, 2013, 5 pages.

McDevitt, et al., Characterization of the Mechanical Properties of ATI 425 Alloy According to the Guidelines of the Metallic Materials Properties Development & Standardization Handbook, Aeromat 2010 Conference and Exposition: Jun. 20-24, 2010, Bellevue, WA, 23 pages.

Metals Handbook, Desk Edition, 2nd ed., J. R. Davis ed., ASM International, Materials Park, Ohio (1998), pp. 575-588.

Military Standard, Fastener Test Methods, Method 13, Double Shear Test, MIL-STD-1312-13, Jul. 26, 1985, superseding MIL-STD-1312 (in part) May 31, 1967, 8 pages.

Military Standard, Fastener Test Methods, Method 13, Double Shear Test, MIL-STD-1312-13A, Aug. 23, 1991, superseding MIL-STD-13, Jul. 26, 1985, 10 pages.

Murray, J.L., et al., Binary Alloy Phase Diagrams, Second Edition, vol. 1, Ed. Massalski, Materials Park, OH; ASM International; 1990, p. 547.

Murray, J.L., The Mn—Ti (Manganese-Titanium) System, Bulletin of Alloy Phase Diagrams, vol. 2, No. 3 (1981) p. 334-343.

Myers, J., "Primary Working, A lesson from Titanium and its Alloys," ASM Course Book 27 Lesson, Test 9, Aug. 1994, pp. 3-4.

Naik, Uma M. et al., "Omega and Alpha Precipitation in Ti—15Mo Alloy," Titanium '80 Science and Technology—Proceedings of the 4th International Conference on Titanium, H. Kimura & O. Izumi Eds. May 19-22, 1980 pp. 1335-1341.

Nguyen et al., "Analysis of bending deformation in triangle heating of steel plates with induction heating process using laminated plate theory", Mechanics Based Design of Structures and Machines, 37, 2009, pp. 228-246.

Nishimura, T. "Ti—15Mo—5Zr—3Al", Materials Properties Handbook: Titanium Alloys, eds. R. Boyer et al., ASM International, Materials Park, OH, 1994, p. 949.

Novikov et al., 17.2.2 Deformable ($\alpha+\beta$) alloys, Chapter 17, Titanium and its Alloys, Metal Science, vol. II Thermal Treatment of the Alloy, Physical Matallurgy, 2009, pp. 357-360.

Nutt, Michael J. et al., "The Application of Ti-15 Beta Titanium Alloy in High Strength Structural Orthopaedic Applications," Program and Abstracts for The Symposium on Titanium Niobium, Zirconium, and Tantalum for Medical and Surgical Applications, Washington, D.C., Nov. 9-10, 2004 Abstract, p. 12.

Nyakana, et al., "Quick Reference Guide for $\beta$ Titanium Alloys in the 00s", Journal of Materials Engineering and Performance, vol. 14, No. 6, Dec. 1, 2005, pp. 799-811.

Pennock, G.M. et al., "The Control of a Precipitation by Two Step Ageing in $\beta$ Ti—15Mo," Titanium '80 Science and Technology—Proceedings of the 4th International Conference on Titanium, H. Kimura & O. Izumi Eds. May 19-22, 1980 pp. 1344-1350.

Prasad, Y.V.R.K. et al. "Hot Deformation Mechanism in Ti—6Al—4V with Transformed B Starting Microstructure: Commercial v. Extra Low Interstitial Grade", Materials Science and Technology, Sep. 2000, vol. 16, pp. 1029-1036.

Qazi, J.I. et al., "High-Strength Metastable Beta-Titanium Alloys for Biomedical Applications," JOM, Nov. 2004 pp. 49-51.

Roach, M.D., et al., "Comparison of the Corrosion Fatigue Characteristics of CPTi-Grade 4, Ti—6Al—4V ELI, Ti—6Al—7 Nb, and Ti—15 Mo", Journal of Testing and Evaluation, vol. 2, Issue 7, (Jul./Aug. 2005) (published online Jun. 8, 2005).

Roach, M.D., et al., "Physical, Metallurgical, and Mechanical Comparison of a Low-Nickel Stainless Steel," Transactions on the 27th Meeting of the Society for Biomaterials, Apr. 24-29, 2001, p. 343.

Roach, M.D., et al., "Stress Corrosion Cracking of a Low-Nickel Stainless Steel," Transactions of the 27th Annual Meeting of the Society for Biomaterials, 2001, p. 469.

Rudnev et at., "Longitudinal flux indication heating of slabs, bars and strips is no longer "Black Magic:" II", Industrial Heating, Feb. 1995, pp. 46-48 and 50-51.

Russo, P.A., "Influence of Ni and Fe on the Creep of Beta Annealed Ti-6242S", Titanium '95: Science and Technology, pp. 1075-1082.

SAE Aerospace Material Specification 4897A (issued Jan. 1997, revised Jan. 2003).

SAE Aerospace, Aerospace Material Specification, Titanium Alloy Bars, Forgings and Forging Stock, 6.0Al—4.0V Annealed, AMS 6931A, Issued Jan. 2004, Revised Feb. 2007, pp. 1-7.

SAE Aerospace, Aerospace Material Specification, Titanium Alloy Bars, Forgings and Forging Stock, 6.0Al—4.0V, Solution Heat Treated and Aged, AMS 6930A, Issued Jan. 2004, Revised Feb. 2006, pp. 1-9.

SAE Aerospace, Aerospace Material Specification, Titanium Alloy, Sheet, Strip, and Plate, 4Al—2.5V—1.5Fe, Annealed, AMS 6946A, Issued Oct. 2006, Revised Jun. 2007, pp. 1-7.

Salishchev et al., "Characterization of Submicron-grained Ti—6Al—4V Sheets with Enhanced Superplastic Properties", Materials Science Forum, Trans Tech Publications, Switzerland, vols. 447-448, 2004, pp. 441-446.

Salishchev et al., "Mechanical Properties of Ti—6Al—4V Titanium Alloy with Submicrocrystalline Structure Produced by Multiaxial Forging", Materials Science Forum, vols. 584-586, 2008, pp. 783-788.

Salishchev, et al., "Effect of Deformation Conditions on Grain Size and Microstructure Homogeneity of $\beta$-Rich Titanium Alloys", Journal of Materials Engineering and Performance, vol. 14(6), Dec. 2005, pp. 709-716.

Salishchev, G.A., "Formation of submicrocrystalline structure in large size billets and sheets out of titanium alloys", Institute for Metals Superplasticity Problems,Ufa, Russia, presented at 2003 NATO Advanced Research Workshop, Kyiv, Ukraine, Sep. 9-13, 2003, 50 pages.

(56) References Cited

OTHER PUBLICATIONS

Semiatin, S.L. et al., "The Thermomechanical Processing of Alpha/Beta Titanium Alloys," Journal of Metals, Jun. 1997, pp. 33-39.
Semiatin et al., "Equal Channel Angular Extrusion of Difficult-to-Work Alloys", Materials & Design, Elsevier Science Ltd., 21, 2000, pp. 311-322.
Semiatin et al., "Alpha/Beta Heat Treatment of a Titanium Alloy with a Nonuniform Microstructure", Metallurgical and Materials Transactions A, vol. 38A, Apr. 2007, pp. 910-921.
Shahan et al., "Adiabatic shear bands in titanium and titanium alloys: a critical review", Materials & Design, vol. 14, No. 4, 1993, pp. 243-250.
SPS Titanium™ Titanium Fasteners, SPS Technologies Aerospace Fasteners, 2003, 4 pages.
Standard Specification for Wrought Titanium-6Aluminum-4Vanadium Alloy for Surgical Implant Applications (UNS R56400), Designation: F 1472-99, ASTM 1999, pp. 1-4.
Swann, P.R. and J. G. Parr, "Phase Transformations in Titanium-Rich Alloys of Titanium and Cobalt", Transactions of The Metallurgical Society of AIME, Apr. 1958, pp. 276-279.
Takemoto Y et al., "Tensile Behavior and Cold Workability of Ti—Mo Alloys", Materials Transactions Japan Inst Metals Japan, vol. 45, No. 5, May 2004, pp. 1571-1576.
Tamarisakandala, S. et al., "Strain-induced Porosity During Cogging of Extra-Low Interstitial Grade Ti—6Al—4V", Journal of Materials Engineering and Performance, vol. 10(2), Apr. 2001, pp. 125-130.
Tamirisakandala et al., "Effect of boron on the beta transus of Ti—6Al—4V alloy", Scripta Materialia, 53, 2005, pp. 217-222.
Tamirisakandala et al., "Powder Metallurgy Ti—6Al—4V-xB Alloys: Processing, Microstructure, and Properties", JOM, May 2004, pp. 60-63.
Tebbe, Patrick A. and Ghassan T. Kridli, "Warm forming aluminum alloys: an overview and future directions", Int. J. Materials and Product Technology, vol. 21, Nos. 1-3, 2004, pp. 24-40.
Technical Presentation: Overview of MMPDS Characterization of ATI 425 Alloy, 2012, 1 page.
Ti—6Al—4V, Ti64, 6Al—4V, 6-4, UNS R56400, 1 page.
TIMET 6-6-2 Titanium Alloy (Ti—6Al—6V—2Sn), Annealed, accessed Jun. 27, 2012.
TIMET TIMETAL® 6-2-4-2 (Ti—6Al—2Sn—4Zr—2Mo—0.08Si) Titanium Alloy datasheet, accessed Jun. 26, 2012.
TIMET TIMETAL® 6-2-4-6 Titanium Alloy (Ti—6Al—2Sn—4Zr—6Mo), Typical, accessed Jun. 26, 2012.
Titanium 3Al—8V—6Cr—4Mo—4Zr Beta-C/Grade 19 UNS R58640, 2 pages.
Tokaji, Keiro et al., "The Microstructure Dependence of Fatigue Behavior in Ti—15Mo—5Zr—3Al Alloy," Materials Science and Engineering A., vol. 213 (1996) pp. 86-92.
Two new α-β titanium alloys, KS Ti-9 for sheet and KS EL-F for forging, with mechanical properties comparable to Ti—6Al—4V, Oct. 8, 2002, ITA 2002 Conference in Orlando, Hideto Oyama, Titanium Technology Dept., Kobe Steel, Ltd., 16 pages.
Veeck, S., et al., "The Castability of Ti-5553 Alloy," Advanced Materials and Processes, Oct. 2004, pp. 47-49.
Weiss, I. et al., "The Processing Window Concept of Beta Titanium Alloys", Recrystallization '90, ed. by T. Chandra, The Minerals, Metals & Materials Society, 1990, pp. 609-616.
Weiss, I. et al., "Thermomechanical Processing of Beta Titanium Alloys—An Overview," Material Science and Engineering, A243, 1998, pp. 46-65.
Williams, J., "Thermo-mechanical processing of high-performance Ti alloys: recent progress and future needs, Journal of Material Processing Technology, 117 (2001), p. 370-373.
Yakymyshyn et al., "The Relationship between the Constitution and Mechanical Properties of Titanium-Rich Alloys of Titanium and Cobalt", 1961, vol. 53, pp. 283-294.
Zardiackas, L.D. et al., "Stress Corrosion Cracking Resistance of Titanium Implant Materials," Transactions of the 27th Annual Meeting of the Society for Biomaterials, (2001).
Zeng et al., Evaluation of Newly Developed Ti-555 High Strength Titanium Fasteners, 17th AeroMat Conference & Exposition, May 18, 2006, 2 pages.
Zhang et al., "Simulation of slip band evolution in duplex Ti—6Al—4V", Acta Materialia, vol. 58, (2010), Nov. 26, 2009, pp. 1087-1096.
Zherebtsov et al., "Production of submicrocrystalline structure in large-scale Ti—6Al—4V billet by warm severe deformation processing", Scripta Materialia, 51, 2004, pp. 1147-1151.
Titanium Alloy, Sheet, Strip, and Plate 4Al—2.5V—1.5Fe, Annealed, AMS6946 Rev. B, Aug. 2010, SAE Aerospace, Aerospace Material Specification, 7 pages.
Titanium Alloy, Sheet, Strip, and Plate 6Al—4V, Annealed, AMS 4911L, Jun. 2007, SAE Aerospace, Aerospace Material Specification, 7 pages.
E112-12 Standard Test Methods for Determining Average Grain Size, ASTM International, Jan. 2013, 27 pages.
ATI Datalloy 2 Alloy, Technical Data Sheet, ATI Properties, Inc., Version 1, Jan. 24, 2013, 6 pages.
ATI AL-6XN® Alloy (UNS N08367), ATI Allegheny Ludlum, 2010, 59 pages.
ATI 800™/ATI 800H™/ATI 800AT™ ATI Technical Data Sheet, Nickel-base Alloys (UNS N08800/N08810/N08811), 2012 Allegheny Technologies Incorporated, Version 1, Mar. 9, 2012, 7 pages.
ATI 825™ Technical Data Sheet, Nickel-base Alloy (UNS N08825), 2013 Allegheny Technologies Incorporated, Version 2, Mar. 8, 2013, 5 pages.
ATI 625™ Alloy Technical Data Sheet, High Strength Nickel-base Alloy (UNS N06625), Allegheny Technologies Incorporated, Version 1, Mar. 4, 2012, 3 pages.
ATI 600™ Technical Data Sheet, Nickel-base Alloy (UNS N06600), 2012 Allegheny Technologies Incorporated, Version 1, Mar. 19, 2012, 5 pages.
Bar definition, ASM Materials Engineering Dictionary, J.R. Davis Ed., ASM International, Materials Park, OH (1992) p. 32.
Billet definition, ASM Materials Engineering Dictionary, J.R. Davis Ed., ASM International, Materials Park, OH (1992) p. 40.
Cogging definition, ASM Materials Engineering Dictionary, J.R. Davis Ed., ASM International, Materials Park, OH (1992) p. 79.
Open die press forging definition, ASM Materials Engineering Dictionary, J.R. Davis Ed., ASM International, Materials Park, OH (1992) pp. 298 and 343.
Thermomechanical working definition, ASM Materials Engineering Dictionary, J.R. Davis Ed., ASM International, Materials Park, OH (1992) p. 480.
Ductility definition, ASM Materials Engineering Dictionary, J.R. Davis Ed., ASM International, Materials Park, OH (1992) p. 131.
AFML-TR-76-80 Development of Titanium Alloy Casting Technology, Aug. 1976, 5 pages.
Valiev et al., "Nanostructured materials produced by sever plastic deformation", Moscow, LOGOS, 2000.
Li et al., "The optimal determination of forging process parameters for Ti—6.5Al—3.5Mo—1.5Zr—0.3Si alloy with thick lamellar microstructure in two phase field based on P-map", Journal of Materials Processing Technology, vol. 210, Issue 2, Jan. 19, 2010, pp. 370-377.
Buijk, A., "Open-Die Forging Simulation", Forge Magazine, Dec. 1, 2013, 5 pages.
Herring, D., "Grain Size and Its Influence on Materials Properties", IndustrialHeating.com, Aug. 2005, pp. 20 and 22.
INCONEL® alloy 600, Special Metals Corporation, www.specialmetals.com, Sep. 2008, 16 pages.
Yaylaci et al., "Cold Working & Hot Working & Annealing", http://yunus.hacettepe.edu.tr/~selis/teaching/WEBkmu479/Ppt/kmu479Presentations2010/Cold_Hot_Working_Annealing.pdf, 2010, 41 pages.
Superaustenitic, http://www.atimetals.com/products/Pages/superaustenitic.aspx, Nov. 9, 2015, 3 pages.
French, D., "Austenitic Stainless Steel", The National Board of Boiler and Pressure Vessel Inspectors Bulletin, 1992, 3 pages.
Acom Magazine, outokumpu, NACE International, Feb. 2013, 16 pages.

(56) References Cited

OTHER PUBLICATIONS

ATI A286™ Iron Based Superalloy (UNS S66286) Technical Data Sheet, Allegheny Technologies Incorporated, Version 1, Apr. 17, 2012, 9 pages.
ATI A286™ (UNS S66286) Technical Data Sheet, Allegheny Technologies Incorporated, Version 1, Mar. 14, 2012, 3 pages.
Corrosion-Resistant Titanium, Technical Data Sheet, Allegheny Technologies Incorporated, Version 1, Feb. 29, 2012, 5 pages.
ATI 3-2.5™ Titanium (Ti Grade 9) Technical Data Sheet, ATI Wah Chang, 2010, 4 pages.
Grade 9 Ti 3Al 2.5V Alloy (UNS R56320), Jul. 30, 2013, http://www.azom.com/article.aspx?ArticleID=9337, 3 pages.
ATI Ti—6Al—4V, Grade 5, Titanium Alloy (UNS R56400) Technical Data Sheet, Allegheny Technologies Incorporated, Version 1, Jan. 31, 2012, 4 pages.
Panin et al., "Low-cost Titanium Alloys for Titanium-Polymer Layered Composites", 29th Congress of the International Council of the Aeronautical Sciences, St. Petersburg, Russia, Sep. 7, 2014, 4 pages.
Grade Ti—4.5Al—3V—2Mo—2Fe Alloy, Jul. 9, 2013, http://www.azom.com/article.aspx?ArticleID=9448, 2 pages.
Garside et al., "Mission Critical Metallics® Recent Developments in High-Strength Titanium Fasteners for Aerospace Applications", ATI, 2013, 21 pages.
Foltz et al., "Recent Developments in High-Strength Titanium Fasteners for Aerospace Applications", ATI, Oct. 22, 2014, 17 pages.
Kosaka et al., "Superplastic Forming Properties of TIMETAL® 54M", Henderson Technical Laboratory, Titanium Metals Corporation, ITA, Oct. 2010, Orlando, Florida, 18 pages.
Office Action dated Oct. 19, 2011 in U.S. Appl. No. 12/691,952.
Office Action dated Feb. 2, 2012 in U.S. Appl. No. 12/691,952.
Office Action dated Dec. 23, 2014 in U.S. Appl. No. 12/691,952.
Office Action dated Apr. 23, 2015 in U.S. Appl. No. 12/691,952.
Office Action dated Jul. 28, 2015 in U.S. Appl. No. 12/691,952.
Office Action dated Feb. 20, 2004 in U.S. Appl. No. 10/165,348.
Office Action dated Oct. 26, 2004 in U.S. Appl. No. 10/165,348.
Office Action dated Feb. 16, 2005 in U.S. Appl. No. 10/165,348.
Office Action dated Jul. 25, 2005 in U.S. Appl. No. 10/165,348.
Office Action dated Jan. 3, 2006 in U.S. Appl. No. 10/165,348.
Office Action dated Dec. 16, 2004 in U.S. Appl. No. 10/434,598.
Office Action dated Aug. 17, 2005 in U.S. Appl. No. 10/434,598.
Office Action dated Dec. 19, 2005 in U.S. Appl. No. 10/434,598.
Office Action dated Sep. 6, 2006 in U.S. Appl. No. 10/434,598.
Office Action dated Aug. 6, 2008 in U.S. Appl. No. 11/448,160.
Office Action dated Jan. 13, 2009 in U.S. Appl. No. 11/448,160.
Notice of Allowance dated Apr. 13, 2010 in U.S. Appl. No. 11/448,160.
Notice of Allowance dated Sep. 20, 2010 in U.S. Appl. No. 11/448,160.
Office Action dated Sep. 26, 2007 in U.S. Appl. No. 11/057,614.
Office Action dated Jan. 10, 2008 in U.S. Appl. No. 11/057,614.
Office Action dated Aug. 29, 2008 in U.S. Appl. No. 11/057,614.
Office Action dated Aug. 11, 2009 in U.S. Appl. No. 11/057,614.
Office Action dated Jan. 14, 2010 in U.S. Appl. No. 11/057,614.
Interview summary dated Apr. 14, 2010 in U.S. Appl. No. 11/057,614.
Office Action dated Jun. 21, 2010 in U.S. Appl. No. 11/057,614.
Notice of Allowance dated Sep. 3, 2010 in U.S. Appl. No. 11/057,614.
Office Action dated Apr. 1, 2010 in U.S. Appl. No. 11/745,189.
Interview summary dated Jun. 3, 2010 in U.S. Appl. No. 11/745,189.
Interview summary dated Jun. 15, 2010 in U.S. Appl. No. 11/745,189.
Office Action dated Nov. 24, 2010 in U.S. Appl. No. 11/745,189.
Interview summary dated Jan. 6, 2011 in U.S. Appl. No. 11/745,189.
Notice of Allowance dated Jun. 27, 2011 in U.S. Appl. No. 11/745,189.
Office Action dated Jan. 11, 2011 in U.S. Appl. No. 12/911,947.
Office Action dated Aug. 4, 2011 in U.S. Appl. No. 12/911,947.
Office Action dated Nov. 16, 2011 in U.S. Appl. No. 12/911,947.
Advisory Action dated Jan. 25, 2012 in U.S. Appl. No. 12/911,947.
Notice of Panel Decision from Pre-Appeal Brief Review dated Mar. 28, 2012 in U.S. Appl. No. 12/911,947.
Office Action dated Apr. 5, 2012 in U.S. Appl. No. 12/911,947.
Office Action dated Sep. 19, 2012 in U.S. Appl. No. 12/911,947.
Advisory Action dated Nov. 29, 2012 in U.S. Appl. No. 12/911,947.
Office Action dated May 31, 2013 in U.S. Appl. No. 12/911,947.
Notice of Allowance dated Oct. 4, 2013 in U.S. Appl. No. 12/911,947.
Office Action dated Jan. 3, 2011 in U.S. Appl. No. 12/857,789.
Office Action dated Jul. 27, 2011 in U.S. Appl. No. 12/857,789.
Advisory Action dated Oct. 7, 2011 in U.S. Appl. No. 12/857,789.
Notice of Allowance dated Jul. 1, 2013 in U.S. Appl. No. 12/857,789.
Office Action dated Nov. 14, 2012 in U.S. Appl. No. 12/885,620.
Office Action dated Jun. 13, 2013 in U.S. Appl. No. 12/885,620.
Office Action dated Nov. 19, 2013 in U.S. Appl. No. 12/885,620.
Advisory Action Before the Filing of an Appeal Brief dated Jan. 30, 2014 in U.S. Appl. No. 12/885,620.
Office Action dated Jun. 18, 2014 in U.S. Appl. No. 12/885,620.
Office Action dated Nov. 28, 2014 in U.S. Appl. No. 12/885,620.
Advisory Action dated May 18, 2015 in U.S. Appl. No. 12/885,620.
Office Action dated Jun. 30, 2015 in U.S. Appl. No. 12/885,620.
Notice of Abandonment dated Jan. 29, 2016 in U.S. Appl. No. 12/885,620.
Office Action dated Nov. 14, 2012 in U.S. Appl. No. 12/888,699.
Office Action dated Oct. 3, 2012 in U.S. Appl. No. 12/838,674.
Office Action dated Jul. 18, 2013 in U.S. Appl. No. 12/838,674.
Office Action dated May 27, 2015 in U.S. Appl. No. 12/838,674.
Applicant Initiated Interview Summary dated Sep. 1, 2015 in U.S. Appl. No. 12/838,674.
Notice of Allowance dated Sep. 25, 2015 in U.S. Appl. No. 12/838,674.
Office Action dated Sep. 26, 2012 in U.S. Appl. No. 12/845,122.
Notice of Allowance dated Apr. 17, 2013 in U.S. Appl. No. 12/845,122.
Office Action dated Dec. 24, 2012 in U.S. Appl. No. 13/230,046.
Notice of Allowance dated Jul. 31, 2013 in U.S. Appl. No. 13/230,046.
Office Action dated Dec. 26, 2012 in U.S. Appl. No. 13/230,143.
Notice of Allowance dated Aug. 2, 2013 in U.S. Appl. No. 13/230,143.
Office Action dated Mar. 1, 2013 in U.S. Appl. No. 12/903,851.
Office Action dated Jan. 16, 2014 in U.S. Appl. No. 12/903,851.
Office Action dated Oct. 6, 2014 in U.S. Appl. No. 12/903,851.
Office Action dated Jul. 15, 2015 in U.S. Appl. No. 12/903,851.
Office Action dated Mar. 25, 2013 in U.S. Appl. No. 13/108,045.
Office Action dated Jan. 17, 2014 in U.S. Appl. No. 13/108,045.
Office Action dated Apr. 16, 2013 in U.S. Appl. No. 13/150,494.
Office Action dated Jun. 14, 2013 in U.S. Appl. No. 13/150,494.
Notice of Allowance dated Nov. 5, 2013 in U.S. Appl. No. 13/150,494.
Supplemental Notice of Allowability dated Jan. 17, 2014 in U.S. Appl. No. 13/150,494.
U.S. Appl. No. 13/331,135, filed Dec. 20, 2011.
Office Action dated Jan. 21, 2015 in U.S. Appl. No. 13/792,285.
Office Action dated Jun. 4, 2015 in U.S. Appl. No. 13/792,285.
Notice of Allowance dated Sep. 16, 2015 in U.S. Appl. No. 13/792,285.
Response to Rule 312 Communication dated Oct. 20, 2015 in U.S. Appl. No. 13/792,285.
Notice of Allowance dated Oct. 24, 2014 in U.S. Appl. No. 13/844,545.
Notice of Allowance dated Feb. 6, 2015 in U.S. Appl. No. 13/844,545.
Office Action dated Jan. 23, 2013 in U.S. Appl. No. 12/882,538.
Office Action dated Feb. 8, 2013 in U.S. Appl. No. 12/882,538.
Notice of Allowance dated Jun. 24, 2013 in U.S. Appl. No. 12/882,538.
Office Action dated Sep. 6, 2013 in U.S. Appl. No. 13/933,222.
Notice of Allowance dated Oct. 1, 2013 in U.S. Appl. No. 13/933,222.
Notice of Allowance dated May 6, 2014 in U.S. Appl. No. 13/933,222.
U.S. Appl. No. 14/594,300, filed Jan. 12, 2015.
Office Action dated Jun. 3, 2015 in U.S. Appl. No. 13/714,465.
Office Action dated Jul. 8, 2015 in U.S. Appl. No. 13/714,465.
Notice of Allowance dated Sep. 2, 2015 in U.S. Appl. No. 13/714,465.
Response to Rule 312 Communication dated Sep. 29, 2015 in U.S. Appl. No. 13/714,465.
Response to Rule 312 Communication dated Oct. 8, 2015 in U.S. Appl. No. 13/714,465.

(56) References Cited

OTHER PUBLICATIONS

Office Action dated Jun. 26, 2015 in U.S. Appl. No. 13/777,066.
Office Action dated Oct. 5, 2015 in U.S. Appl. No. 13/777,066.
Office Action dated Aug. 19, 2015 in U.S. Appl. No. 13/844,196.
Office Action dated Oct. 15, 2015 in U.S. Appl. No. 13/844,196.
Office Action dated Oct. 2, 2015 in U.S. Appl. No. 14/073,029.
Office Action dated Oct. 28, 2015 in U.S. Appl. No. 14/093,707.
Notice of Third-Party Submission dated Dec. 16, 2015 in U.S. Appl. No. 14/077,699.
ATI Datalloy HP™ Alloy, UNS N08830, Technical Data Sheet Version 1, Apr. 14, 2015, 6 pages.
ATI Datalloy 2® Alloy, Technical Data Sheet, Version 1, Feb. 20, 2014, 6 pages.
Handa, Sukhdeep Singh, "Precipitation of Carbides in a Ni-based Superalloy", Degree Project for Master of Science with Specialization in Manufacturing Department of Engineering Science, University West, Jun. 30, 2014, 42 pages.
Office Action dated Feb. 17, 2016 in U.S. Appl. No. 12/691,952.
Office Action dated Jun. 28, 2016 in U.S. Appl. No. 12/691,952.
Office Action dated Mar. 30, 2016 in U.S. Appl. No. 13/108,045.
Advisory Action Before the Filing of an Appeal Brief dated Mar. 17, 2016 in U.S. Appl. No. 13/777,066.
Office Action dated Jul. 22, 2016 in U.S. Appl. No. 13/777,066.
Office Action dated Feb. 12, 2016 in U.S. Appl. No. 13/844,196.
Advisory Action Before the Filing of an Appeal Brief dated Jun. 15, 2016 in U.S. Appl. No. 13/844,196.
Office Action dated Aug. 12, 2016 in U.S. Appl. No. 14/073,029.
Office Action dated Mar. 17, 2016 in U.S. Appl. No. 14/093,707.
Advisory Action Before the Filing of an Appeal Brief dated Jun. 10, 2016 in U.S. Appl. No. 14/093,707.
Office Action dated Jul. 25, 2016 in U.S. Appl. No. 14/077,699.
Office Action dated Mar. 16, 2016 in U.S. Appl. No. 15/005,281.
Office Action dated Apr. 5, 2016 in U.S. Appl. No. 14/028,588.
Office Action dated Aug. 8, 2016 in U.S. Appl. No. 14/028,588.
Office Action dated Apr. 13, 2016 in U.S. Appl. No. 14/083,759.
Office Action dated May 6, 2016 in U.S. Appl. No. 14/083,759.
Markovsky, P. E., "Preparation and properties of ultrafine (submicron) structure titanium alloys", Materials Science and Engineering, 1995, A203, 4 pages.
Titanium Alloy Guide, RMI Titanium Company, Jan. 2000, 45 pages.
Wanhill et al, "Chapter 2, Metallurgy and Microstructure", Fatigue of Beta Processed and Beta Heat-treated Titanium Alloys, SpringerBriefs in Applied Sciences and Technology, 2012, pp. 5-10.
Heat Treating of Titanium and Titanium Alloys, http://www.totalmateria.com/Article97.htm, Apr. 2004, 5 pages.
Grade 6Al 2Sn 4Zr 6Mo Titanium Alloy (UNS R56260), AZoM, http://www.azom.com/article.aspx?ArticleID=9305, Jun. 20, 2013, 4 pages.
Gammon et al., "Metallography and Microstructures of Titanium and Its Alloys", ASM Handbook, vol. 9: Metallography and Microstructures, ASM International, 2004, pp. 899-917.
Rui-gang Deng, et al. "Effects of Forging Process and Following Heat Treatment on Microstructure and Mechanical Properties of TC11 Titanium Alloy," Materials For Mechanical Engineering, vol. 35. No. 11, Nov. 2011, 5 pages. (English abstract included).
Srinivasan et al., "Rolling of Plates and Sheets from As-Cast Ti—6Al—4V—0.1 B", Journal of Materials Engineering and Performance, vol. 18.4, Jun. 2009, pp. 390-398.
Longxian et al., "Wear-Resistant Coating and Performance Titanium and Its Alloy, and properties thereof", Northeastern University Press, Dec. 2006, pp. 26-28, 33.
"Acceleration and Improvement for Heat Treating Workers," Quick Start and Improvement for Heat Treatment, ed. Yang Man, China Machine Press, Apr. 2008, pp. 265-266.
Applicant-Initiated Interview Summary dated Aug. 22, 2016 in U.S. Appl. No. 12/691,952.
Advisory Action Before the Filing of an Appeal Brief dated Aug. 30, 2016 in U.S. Appl. No. 12/691,952.
Office Action dated Apr. 28, 2017 in U.S. Appl. No. 12/691,952.
Office Action dated Jul. 10, 2017 in U.S. Appl. No. 12/691,952.
Advisory Action dated Aug. 7, 2017 in U.S. Appl. No. 12/691,952.
Examiner's Answer to Appeal Brief dated Oct. 27, 2016 in U.S. Appl. No. 12/903,851.
Decision on Appeal dated Dec. 15, 2017 in U.S. Appl. No. 12/903,851.
Office Action dated Sep. 9, 2016 in U.S. Appl. No. 13/108,045.
Advisory Action dated Mar. 7, 2017 in U.S. Appl. No. 13/108,045.
Office Action dated Oct. 12, 2016 in U.S. Appl. No. 13/777,066.
Office Action dated May 18, 2017 in U.S. Appl. No. 13/777,066.
Advisory Action Before the Filing of an Appeal Brief dated Jul. 10, 2017 in U.S. Appl. No. 13/777,066.
Notice of Allowance dated Aug. 30, 2017 in U.S. Appl. No. 13/777,066.
Corrected Notice of Allowability dated Dec. 20, 2017 in U.S. Appl. No. 13/777,066.
Office Action dated Aug. 22, 2016 in U.S. Appl. No. 13/844,196.
Office Action dated Dec. 29, 2016 in U.S. Appl. No. 13/844,196.
Notice of Allowance dated Jul. 13, 2017 in U.S. Appl. No. 13/844,196.
Corrected Notice of Allowability dated Jul. 20 2017 in U.S. Appl. No. 13/844,196.
Corrected Notice of Allowability dated Aug. 18, 2017 in U.S. Appl. No. 13/844,196.
Office Action dated Jun. 14, 2017 in U.S. Appl. No. 14/073,029.
Notice of Allowance dated Jul. 7, 2017 in U.S. Appl. No. 14/073,029.
Notice of Allowability dated Sep. 21, 2017 in U.S. Appl. No. 14/073,029.
Office Action dated Sep. 30, 2016 in U.S. Appl. No. 14/093,707.
Notice of Allowance dated Jan. 13, 2017 in U.S. Appl. No. 14/093,707.
Supplemental Notice of Allowance dated Jan. 27, 2017 in U.S. Appl. No. 14/093,707.
Supplemental Notice of Allowance dated Feb. 10, 2017 in U.S. Appl. No. 14/093,707.
Supplemental Notice of Allowability dated Mar. 1, 2017 in U.S. Appl. No. 14/093,707.
Office Action dated Aug. 16, 2016 in U.S. Appl. No. 14/077,699.
Office Action dated Oct. 25, 2016 in U.S. Appl. No. 14/077,699.
Advisory Action dated Nov. 30, 2016 in U.S. Appl. No. 14/077,699.
Office Action dated Dec. 1, 2017 in U.S. Appl. No. 14/077,699.
Office Action dated Aug. 26, 2016 in U.S. Appl. No. 15/005,281.
Notice of Panel Decision from Pre-Appeal Brief Review dated Feb. 24, 2017 in U.S. Appl. No. 15/005,281.
Office Action dated Mar. 2, 2017 in U.S. Appl. No. 15/005,281.
Notice of Allowance dated May 10, 2017 in U.S. Appl. No. 15/005,281.
Corrected Notice of Allowability dated Aug. 9, 2017 in U.S. Appl. No. 15/005,281.
Advisory Action dated Oct. 14, 2016 in U.S. Appl. No. 14/028,588.
Applicant Initiated Interview Summary dated Oct. 27, 2016 in U.S. Appl. No. 14/028,588.
Office Action dated Mar. 15, 2017 in U.S. Appl. No. 14/028,588.
Office Action dated Jul. 14, 2017 in U.S. Appl. No. 14/028,588.
Advisory Action dated Sep. 12, 2017 in U.S. Appl. No. 14/028,588.
Notice of Panel Decision from Pre-Appeal Brief Review dated Oct. 27, 2017 in U.S. Appl. No. 14/028,588.
Notice of Allowance dated Oct. 13, 2016 in U.S. Appl. No. 14/083,759.
U.S. Appl. No. 15/348,140, filed Nov. 10, 2016.
Notice of Allowance dated Dec. 16, 2016 in U.S. Appl. No. 14/922,750.
Notice of Allowance dated Feb. 28, 2017 in U.S. Appl. No. 14/922,750.
Office Action dated Apr. 10, 2017 in U.S. Appl. No. 14/594,300.
Office Action dated May 25, 2017 in U.S. Appl. No. 14/594,300.
Office Action dated Sep. 13, 2017 in U.S. Appl. No. 14/594,300.
U.S. Appl. No. 15/653,985, filed Jul. 19, 2017.
Office Action dated Oct. 31, 2017 in U.S. Appl. No. 15/653,985.
U.S. Appl. No. 15/816,128, filed Nov. 17, 2017.
Notice of Allowance dated Jun. 6, 2018 in U.S. Appl. No. 12/691,952.
Office Action dated Apr. 6, 2018 in U.S. Appl. 12/903,851.
Office Action dated Feb. 27, 2018 in U.S. Appl. No. 13/108,045.
Interview Summary dated Mar. 12, 2018 in U.S. Appl. No. 14/077,699.
Notice of Allowance dated Feb. 9, 2018 in U.S. Appl. No. 14/028,588.
Advisory Action dated Jan. 26, 2018 in U.S. Appl. No. 14/594,300.

(56) References Cited

OTHER PUBLICATIONS

Office Action dated Feb. 28, 2018 in U.S. Appl. No. 14/594,300.
Office Action dated Mar. 16, 2018 in U.S. Appl. No. 15/653,985.
Office Action dated Apr. 2, 2018 in U.S. Appl. No. 14/881,633.
Forging Machinery, Dies, Processes, Metals Handbook Desk Edition, ASM International, 1998, pp. 839-863.
Smith, et al. "Types of Heat-Treating Furnaces," Heat Treating, ASM Handbook, ASM International, 1991, vol. 4, p. 465-474.
Concise Explanation for Third Party Preissuance submission under Rule 1.290 filed in U.S. Appl. No. 15/678,527 on Jun. 5, 2018.
Guidelines for PWR Steam Generator Tubing Specifications and Repair, Electric Power Research Institute, Apr. 14, 1999, vol. 2, Revision 1, 74 pages. (accessed at https://www.epri.com/#/pages/product/TR-016743-V2R1/).
Materials Reliability Program: Guidelines for Thermally Treated Alloy 690 Pressure Vessel Nozzels, (MRP-241), Electric Power Research Institute, Jul. 25, 2008, 51 pages. (accessed at https://www.epri.com/#/pages/product/1015007/).
Microstructure Etching and Carbon Analysis Techniques, Electric Power Research Institute, May 1, 1990, 355 pages. (accessed at https://www.epri.com/#/pages/product/NP-6720-SD/).
Frodigh, John, "Some Factors Affecting the Appearance of the Microstructure in Alloy 690", Proceedings of the Eighth International Symposium on Environmental Degradation of Materials in Nuclear Power Systems—Water Reactors, American Nuclear Society, Inc., vol. 1, Aug. 10, 1997, 12 pages.
Kajimura et al., "Corrosion Resistance of TT Alloy 690 Manufactured by Various Melting Processes in High Temperature NaOH Solution", Proceedings of the Eighth International Symposium on Environmental Degradation of Materials in Nuclear Power Systems—Water Reactors, American Nuclear Society, Inc., vol. 1, Aug. 10, 1997, pp. 149-156.
The Japan Society for Heat Treatment, Introduction of Heat Treatment, Japan, Minoru, Kanai, Jan. 10, 1974, p. 150.
Notice of Allowability dated Jul. 20, 2018 in U.S. Appl. No. 12/691,952.
Office Action dated Oct. 26, 2018 in U.S. Appl. No. 12/903,851.
Office Action dated Nov. 2, 2018 in U.S. Appl. No. 13/108,045.
Office Action dated Jul. 17, 2018 in U.S. Appl. No. 14/077,699.
Office Action dated Jan. 10, 2019 in U.S. Appl. No. 14/077,699.
Notice of Allowance dated Sep. 6, 2018 in U.S. Appl. No. 14/028,588.
Notice of Allowance dated Jun. 29, 2018 in U.S. Appl. No. 14/594,300.
Corrected Notice of Allowability dated Jul. 9, 2018 in U.S. Appl. No. 14/594,300.
Notice of Allowance dated Aug. 15, 2018 in U.S. Appl. No. 15/653,985.
Office Action dated Aug. 6, 2018 in U.S. Appl. No. 14/881,633.
Notice of Allowance dated Jun. 22, 2018 in U.S. Appl. No. 15/433,443.
Notice of Allowability dated Aug. 27, 2018 in U.S. Appl. No. 15/433,443.
Corrected Notice of Allowability dated Sep. 6, 2018 in U.S. Appl. No. 15/433,443.
Notice of Allowability dated Oct. 11, 2018 in U.S. Appl. No. 15/433.443.
Corrected Notice of Allowability dated Oct. 18, 2018 in U.S. Appl. No. 15/433,443.
Office Action dated Aug. 28, 2018 in U.S. Appl. No. 15/678,527.
U.S. Appl. No. 16/122,174, filed Sep. 5, 2018.
U.S. Appl. No. 16/122,450, filed Sep. 5, 2018.
Office Action dated Jan. 10, 2019 in U.S. Appl. No. 15/659,661.

* cited by examiner

PROCESSING OF ALPHA-BETA TITANIUM ALLOYS

BACKGROUND OF THE TECHNOLOGY

Field of the Technology

The present disclosure relates to novel methods of processing certain cold workable alpha-beta titanium alloys, to alloys made using such methods, and to articles including such alloys. A particular non-limiting aspect of the present disclosure relates to fasteners and fastener stock including alloys made using the novel methods herein.

Description of the Background of the Technology

Titanium alloys typically exhibit a high strength-to-weight ratio, are corrosion resistant, and are resistant to creep at moderately high temperatures. For those reasons, titanium alloys are used in many aerospace, aeronautic, defense, marine, and automotive applications including, for example, landing gear members, engine frames, ballistic armor, hulls, and mechanical fasteners.

Reducing the weight of an aircraft or other motorized vehicle can provide fuel savings. As such, for example, there is a strong drive in the aerospace industry to reduce aircraft weight. Titanium and titanium alloys are attractive materials for achieving weight reduction in aircraft applications because of their high strength-to-weight ratios and other advantageous mechanical properties.

Ti-6Al-4V alloy (ASTM Grade 5; UNS R56400; AMS 4965), which is an alpha-beta titanium alloy, is used in a number of applications that benefit from the alloy's advantageous combination of light weight, corrosion resistance, and high strength at low to moderate temperatures. For example, many titanium alloy parts used in aerospace applications are made from Ti-6Al-4V alloy. More generally, Ti-6Al-4V alloy is used to produce aircraft engine components, aircraft structural components, high-performance automotive components, components for medical devices, sports equipment, components for marine applications, components for chemical processing equipment, and fasteners. Typical minimum specifications for Ti-6Al-4V alloy small diameter fastener stock (i.e., fastener stock having a diameter less than 0.5 inch (1.27 cm)) are 170 ksi (1,172 MPa) ultimate tensile strength (UTS) (as determined according to ASTM E8/E8M 09 ("Standard Test Methods for Tension Testing of Metallic Materials" ASTM International, 2009)) and 103 ksi (710 MPa) double shear strength (DSS) (as determined according to NASM 1312-13 (Revision 2, 2013) Fastener Test Methods—Double Shear Test (Aerospace Industries Association)).

Iron and nickel based superalloys, such as, for example, A286 iron-base superalloy (UNS S66286), are representative of materials used in aerospace fastener applications having the next tier of strength. Typical specified minimum strengths for cold drawn and aged A286 alloy fasteners are 180 ksi (1,241 MPa) UTS and 108 ksi (744 MPa) DSS.

Alloy 718 nickel based superalloy (UNS N07718) is a material used in aerospace fasteners that represents the uppermost tier of strength. Typical specified minimums for cold drawn and aged Alloy 718 superalloy fasteners are 220 ksi (1,517 MPa) UTS and 120 ksi (827 MPa) DSS. Nickel and steel fastening systems often use a drawing and aging processing route to attain their high strengths. Historically, a drawing and aging process has not been used with Ti-6Al-4V alloy or with other titanium alloys due to the alloys' low ductility at room temperature. This is well known in the industry.

Titanium has considerably lower density than steel or nickel, which results in significant weight savings in aerospace fastener and other applications. However, certain low temperature applications require strength above that typically attainable with current titanium alloy fastener materials. In addition, the heat treatment steps used to produce conventional titanium alloy fasteners can be lengthy, resulting in a process bottleneck during fastener production. For example, conventional aging times for finished titanium alloy fasteners can range from 4 to 12 hours, and typically are 8 to 10 hours. It would be advantageous to provide titanium alloy fastener materials that exhibit high strength, such as the strength obtainable with Ti-6Al-4V alloy fasteners, but without the need for the lengthy aging times currently used to attain desired strength levels.

Ductility is a property of any given metallic material (i.e., metals and metal alloys). The cold formability (also referred to as "cold workability") of a metallic material is based on the material's near room temperature ductility and ability to deform without cracking. High-strength alpha-beta titanium alloys such as, for example, Ti-6Al-4V alloy, typically have low cold formability at or near room temperature. This limits their acceptance of cold drawing and other low-temperature forming given that the alloys are susceptible to cracking and other breakage when worked at low temperatures. Because of their limited cold formability at or near room temperature, alpha-beta titanium alloys typically are processed by techniques involving extensive hot working. Titanium alloys that exhibit relatively high room temperature ductility generally also exhibit relatively low strength. A consequence of this is that high-strength alloys typically are more difficult to manufacture, requiring extensive working at temperatures above several hundred degrees Celsius to homogeneously deform the HCP and BCC crystal structures.

The HCP crystal structure is common to many engineering materials, including magnesium, titanium, zirconium, and cobalt alloys. The HCP crystal structure has an ABABAB stacking sequence, whereas other metallic alloys such as stainless steel, brass, nickel alloys, and aluminum alloys typically have face centered cubic (FCC) crystal structures with ABCABCABC stacking sequences. As a result of this difference in stacking sequence, HCP metals and alloys have a significantly reduced number of mathematically possible independent slip systems relative to FCC materials. A number of the independent slip systems in HCP metals and alloys require significantly higher stresses to activate, and these "high resistance" deformation modes complete their activation with the formation of cracks. This effect is temperature sensitive, such that below temperatures of several hundred degrees Celsius, titanium alloys exhibit significantly lower malleability.

In combination with the slip systems present in HCP materials, a number of twinning systems are possible in unalloyed HCP metals. The combination of the slip systems and the twinning systems in titanium enables sufficient independent modes of deformation so that "commercially pure" (CP) titanium can be cold worked at temperatures in the vicinity of room temperature (i.e., in an approximate temperature range of −100° C. to +200° C.).

Alloying effects in titanium and other HCP metals and alloys tend to increase the asymmetry, or difficulty, of "high resistance" slip modes, as well as suppress twinning systems from activation. A result is the macroscopic loss of cold-processing capability in alloys such as Ti-6Al-4V alloy and Ti-6Al-2-Sn-4Zr-2Mo-0.1Si alloy. Ti-6Al-4V alloy and Ti-6Al-2-Sn-4Zr-2Mo-0.1S alloy exhibit relatively high strength due to their high concentrations of alpha phase and alloying elements. In particular, aluminum is known to increase the strength of titanium alloys at both room and elevated temperatures. However, aluminum also is known to adversely affect room temperature processing capability.

In general, alloys exhibiting high cold formability can be manufactured more efficiently in terms of both energy consumption and the amount of scrap generated during processing. Thus, in general, it is advantageous to formulate an alloy that can be processed at relatively low temperatures.

Some known titanium alloys have delivered increased room-temperature processing capability by including large concentrations of beta phase stabilizing alloying additions. Examples of such alloys include Beta C titanium alloy (Ti-3Al-8V-6Cr-4Mo-4Zr, UNS R58649), which is commercially available in one form as ATI® 38-644™ beta titanium alloy from Allegheny Technologies Incorporated, Pittsburgh, Pa. USA. ATI® 38-644™ beta titanium alloy and similarly formulated alloys provide advantageous cold formability by limiting or eliminating alpha phase from the microstructure. Typically, these alloys can precipitate alpha phase during low-temperature aging treatments.

Despite their advantageous cold formability, beta titanium alloys, in general, have two disadvantages: expensive alloying additions and poor elevated-temperature creep strength. The poor elevated-temperature creep strength is a result of the significant concentration of beta phase these alloys exhibit at elevated temperatures such as, for example, 500° C. Beta phase does not resist creep well due to its body centered cubic structure, which provides for a large number of deformation mechanisms. Machining beta titanium alloys also is known to be difficult due to the alloys' relatively low elastic modulus, which allows more significant spring-back. As a result of these shortcomings, the use of beta titanium alloys has been limited.

Two beta titanium alloys in use or under consideration as high-strength fastener materials exhibit 180 ksi (1,241 MPa) minimum UTS and 108 ksi (744.6 MPa) minimum DSS. SPS Technologies, Jenkintown, Pa. USA, offers a titanium alloy fastener fabricated from an optimized beta titanium alloy that conforms to the chemistry of Ti-3Al-8V-6Cr-4Zr-4Mo titanium alloy (AMS 4958). The SPS bolts are available in diameters up to 1 inch (2.54 cm). Alcoa Fastening Systems (AFS) has developed a high-strength fastener made from a titanium alloy that conforms to the nominal chemistry of Ti-5Al-5Mo-5V-3Cr-0.5Fe titanium alloy (also referred to as Ti-5553 alloy; UNS unassigned), a near beta titanium alloy. The AFS Ti-5553 alloy fasteners reportedly exhibit tensile strength of 190 ksi (1,309 MPa), greater than 10% elongation, and minimum DSS of 113 ksi (779 MPa) for uncoated parts and 108 ksi (744 MPa) for coated parts.

As discussed, beta titanium alloys generally include a high alloying content, which increases the cost of components and processing compared with alpha-beta titanium alloys. Beta titanium alloys also generally have a higher density than alpha-beta titanium alloys. For example ATI 425® alpha-beta titanium alloy has a density of about 0.161 lbs./in$^3$ (4.5 g/cm$^3$), whereas the beta titanium alloy Ti-3Al-8V-6Cr-4Zr-4Mo alloy has a density of about 0.174 lbs./in$^3$ (4.8 g/cm$^3$), and the near beta titanium alloy Ti-5Al-5Mo-5V-3Cr-0.5Fe alloy has a density of about 0.168 lbs./in$^3$ (4.7 g/cm$^3$). (ATI 425® alpha-beta titanium alloy is a commercial version of Ti-4Al-2.5V alloy (UNS R54250) and is available from Allegheny Technologies Incorporated, Pittsburgh, Pa. USA.) Fasteners made from titanium alloys that are less dense may provide further weight savings for aerospace applications. In addition, the bimodal microstructure that is obtained, for example, in solution treated and aged alpha-beta titanium alloys may provide improved mechanical properties such as high cycle fatigue compared to beta titanium alloys. Alpha-beta titanium alloys also have a higher beta transus temperature ($T_\beta$) than beta titanium alloys. For example, the $T_\beta$ of ATI 425® alpha-beta titanium alloy is about 982.2° C., whereas Ti-5Al-5Mo-5V-3Cr-0.5Fe beta titanium alloy has a $T_\beta$ of about 860° C. The generally higher $T_\beta$ of the alpha-beta titanium alloy allows for a larger temperature window for thermomechanical processing and heat treatment in the alpha-beta phase field.

A prior art process for producing alpha-beta titanium alloy fastener stock and fasteners from ATI 425® alloy (UNS R54250) is disclosed in co-pending U.S. patent application Ser. No. 12/903,851, which is hereby incorporated by reference herein in its entirety. Referring to FIG. 1, a process 10 for producing alpha-beta titanium alloy fastener stock and fasteners includes solution treating 12 an alpha-beta titanium alloy, which normally is in the form of a coil, by heating the alpha-beta titanium alloy in the temperature range of 843° C. to 982° C. for 0.5 to 2 hours. After solution treating, the alpha-beta titanium alloy is water quenched 14. Optionally, the solution treated alpha-beta titanium alloy can undergo a process such as hot or cold heading (not shown). The solution treated alpha-beta titanium alloy is then aged 16 by heating the solution treated alpha-beta titanium alloy in a temperature range of 315° C. to 537.8° C. for 2 to 12 hours to provide a solution treated and aged (STA) fastener stock. After aging 16, the STA fastener stock comprising ATI 425® alloy can be subjected to cold deformation 18 processes such as, for example, thread rolling, to form a fastener.

Lower cost titanium products would be possible if existing titanium alloys were more resistant to cracking during cold processing, i.e., if the alloys exhibited increased cold formability. Since alpha-beta titanium alloys represent the majority of all alloyed titanium produced, the costs to process such alloys could be reduced significantly by improving cold formability. Therefore, alloys of commercial interest include high-strength, cold-deformable alpha-beta titanium alloys. Several alloys within this class have been developed recently. For example, in the past 20 years, Ti-4Al-2.5V alloy (UNS R54250), Ti-4.5Al-3V-2Mo-2Fe alloy, Ti-5Al-4V-0.7Mo-0.5Fe alloy (TIMETAL 54M), and Ti-3Al-5Mo-5V-3Cr-0.4Fe alloy have been developed. Ti-4.5Al-3V-2Mo-2Fe alloy, also known as SP-700 alloy (UNS not assigned), is a cold-deformable, high-strength alpha-beta titanium alloy that, unlike Ti-4Al-2.5V alloy, includes relatively high cost alloying ingredients. Similar to Ti-4Al-2.5V alloy, SP-700 alloy exhibits reduced creep resistance due to increased beta phase content. Ti-3Al-5Mo-5V-3Cr-0.4Fe alloy also exhibits good room temperature forming capabilities and, given its significant beta phase content at room temperature, exhibits relatively poor creep resistance.

SUMMARY

It is understood that the inventions disclosed and described in this specification are not limited to the embodiments described in this Summary.

According to a non-limiting aspect of the present disclosure, a method for increasing the tensile strength of an alpha-beta titanium alloy comprises solution heat treating a cold workable alpha-beta titanium alloy by heating the titanium alloy in a temperature range of $T_\beta$-106° C. to $T_\beta$-72.2° C., where $T_\beta$ is the beta transus temperature of the titanium alloy, for 15 minutes to 2 hours. In a non-limiting embodiment of the method, after heating the titanium alloy, the titanium alloy is cooled to ambient temperature at a cooling rate of at least 3000° C./minute. In another non-limiting embodiment of the method, after heating the titanium alloy, the titanium alloy is cooled to ambient temperature at a cooling rate at least as great as a cooling rate achieved with water cooling. After cooling the titanium alloy to ambient temperature, the titanium alloy is cold worked to impart an effective strain in a range of 5 percent to 35 percent. Subsequent to cold working the titanium alloy, the titanium alloy is aged by heating in a temperature range of $T_\beta$-669° C. to $T_\beta$-517° C. for 1 to 8 hours.

In certain non-limiting embodiments of the foregoing method for increasing the tensile strength of an alpha-beta titanium alloy according to the present disclosure, the cold workable alpha-beta titanium alloy comprises, in weight percentages based on total alloy weight: 2.9 to 5.0 aluminum; 2.0 to 3.0 vanadium; 0.4 to 2.0 iron; 0.2 to 0.3 oxygen; 0.005 to 0.3 carbon; optionally, one or more of tin, zirconium, molybdenum, chromium, nickel, silicon, copper, niobium, tantalum, manganese, cobalt, boron, and yttrium; titanium; and impurities. In a non-limiting embodiment, the sum of the weight percentages of any tin, zirconium, molybdenum, chromium, nickel, silicon, copper, niobium, tantalum, manganese, cobalt, boron, and yttrium present in the titanium alloy is less than 0.5 weight percent, wherein the individual concentrations of any tin, zirconium, molybdenum, chromium, nickel, silicon, copper, niobium, tantalum, manganese, and cobalt present in the alloy are each no greater than 0.1 weight percent, and the individual concentrations of any boron and yttrium present in the alloy are each less than 0.005 weight percent.

Another non-limiting aspect of the present disclosure is directed to a method for producing an alpha-beta titanium alloy fastener stock comprising heating an alpha-beta titanium alloy in a temperature range of 866° C. to 899° C. for 15 minutes to 2 hours. The heated alpha-beta titanium alloy is water quenched. After water quenching, the alpha-beta titanium alloy is cold worked to impart an effective strain in a range of 5 percent to 35 percent. The alpha-beta titanium alloy is then aged by heating in a temperature range of 302° C. to 454° C. for 1 to 8 hours.

In certain non-limiting embodiments of the foregoing method, the alpha-beta titanium alloy comprises, in weight percentages based on total alloy weight: 2.9 to 5.0 aluminum; 2.0 to 3.0 vanadium; 0.4 to 2.0 iron; 0.2 to 0.3 oxygen; 0.005 to 0.3 carbon; optionally, one or more of tin, zirconium, molybdenum, chromium, nickel, silicon, copper, niobium, tantalum, manganese, cobalt, boron, and yttrium; titanium; and impurities. In a non-limiting embodiment, the sum of the weight percentages of any tin, zirconium, molybdenum, chromium, nickel, silicon, copper, niobium, tantalum, manganese, cobalt, boron, and yttrium present in the titanium alloy is less than 0.5 weight percent, wherein the individual concentrations of any tin, zirconium, molybdenum, chromium, nickel, silicon, copper, niobium, tantalum, manganese, and cobalt present in the alloy are each no greater than 0.1 weight percent, and the individual concentrations of any boron and yttrium present in the alloy are each less than 0.005 weight percent.

In a non-limiting embodiment of a method for producing an alpha-beta titanium alloy fastener stock according to the present disclosure, cold working comprises drawing the alpha-beta titanium alloy. In another non-limiting embodiment of a method for producing an alpha-beta titanium alloy fastener stock according to the present disclosure, cold working comprises swaging the alpha-beta titanium alloy.

Another non-limiting aspect according to the present disclosure is directed to an article of manufacture selected from: a hot rolled, solution treated, and cold worked alpha-beta titanium alloy fastener; and hot rolled, solution treated, and cold worked alpha-beta titanium alloy fastener stock. In certain non-limiting embodiments, the alpha-beta titanium alloy fastener and the alpha-beta titanium alloy fastener stock according to the present disclosure comprise, in weight percentages based on total alloy weight: 2.9 to 5.0 aluminum; 2.0 to 3.0 vanadium; 0.4 to 2.0 iron; 0.2 to 0.3 oxygen; 0.005 to 0.3 carbon; optionally, one or more of tin, zirconium, molybdenum, chromium, nickel, silicon, copper, niobium, tantalum, manganese, cobalt, boron, and yttrium; titanium; and impurities. In a non-limiting embodiment, the sum of the weight percentages of any tin, zirconium, molybdenum, chromium, nickel, silicon, copper, niobium, tantalum, manganese, cobalt, boron, and yttrium present in the alpha-beta titanium alloy fastener or the alpha-beta titanium alloy fastener stock is less than 0.5 weight percent, wherein the individual concentrations of any tin, zirconium, molybdenum, chromium, nickel, silicon, copper, niobium, tantalum, manganese, and cobalt present are each no greater than 0.1 weight percent, and the individual concentrations of any boron and yttrium present are each less than 0.005 weight percent.

Non-limiting embodiments of a hot rolled, solution treated, and cold worked alpha-beta titanium alloy fastener according to the present disclosure include a bolt, a nut, a stud, a screw, a washer, a lock washer, and a rivet. A non-limiting embodiment of hot rolled, solution treated, and cold worked alpha-beta titanium alloy fastener stock according to the present disclosure is a fastener stock that is in the form of a straight length.

BRIEF DESCRIPTION OF THE DRAWINGS

Various features and characteristics of the non-limiting and non-exhaustive embodiments disclosed and described in this specification may be better understood by reference to the accompanying figures, in which.

Figure 1:
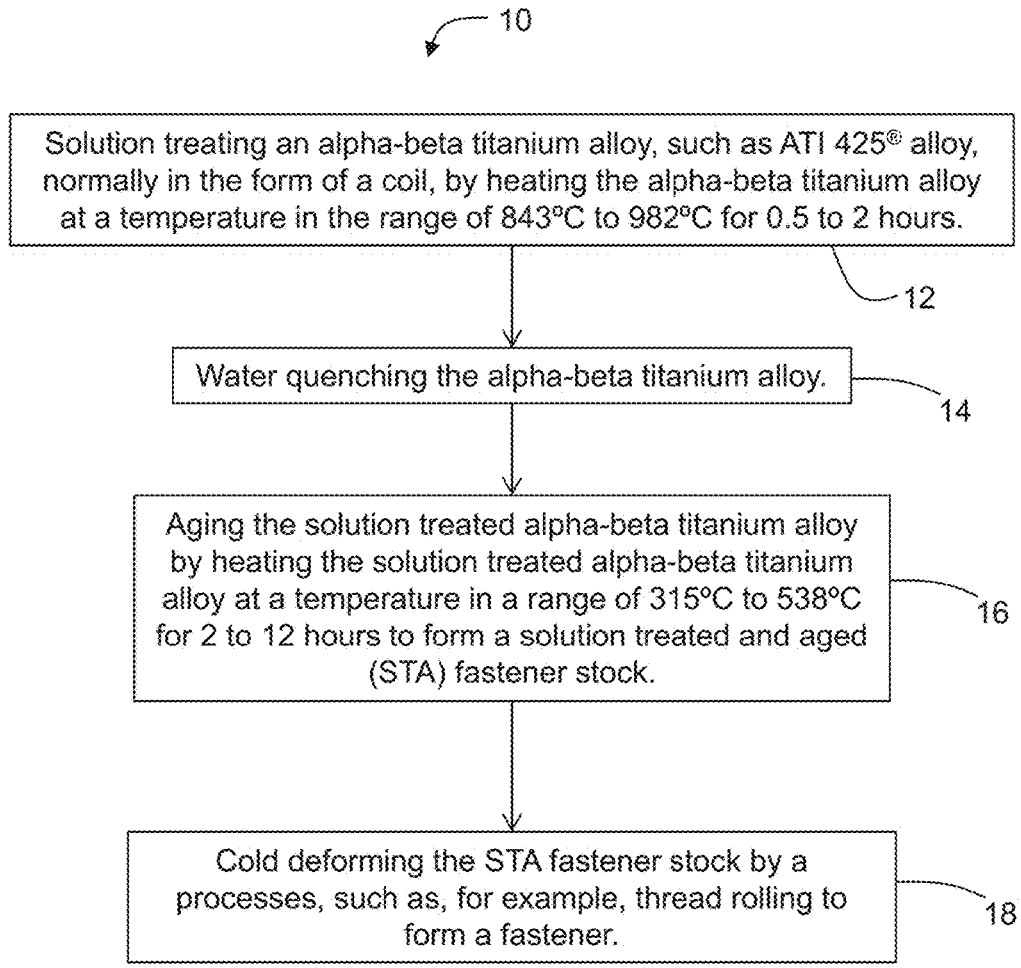
FIG. 1 is a flow diagram of a prior art method for making fastener stock and fasteners from an alpha-beta titanium alloy.

The reader will appreciate the foregoing details, as well as others, upon considering the following detailed description of various non-limiting and non-exhaustive embodiments according to the present disclosure.

DESCRIPTION

Various embodiments are described and illustrated in this specification to provide an overall understanding of the disclosed methods and articles. It is understood that the various embodiments described and illustrated in this specification are non-limiting and non-exhaustive. Thus, the present invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

All percentages and ratios provided herein for an alloy composition are weight percentages based on the total weight of the particular alloy composition, unless otherwise indicated.

Any patent, publication, or other disclosure material that is said to be incorporated, in whole or in part, by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a). Additionally, as used herein when referring to compositional elemental ranges, the phrase "up to" includes zero unless the particular element is present as an unavoidable impurity, or unless "up to" is preceded by the wording "greater than zero and".

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components and, thus, possibly, more than one component is contemplated and may be employed or used in an implementation of the described embodiments. Further, the use of a singular noun includes the plural, and the use of a plural noun includes the singular, unless the context of the usage requires otherwise.

As used herein in connection with the present invention, "cold working", "cold worked", "cold forming", and like terms, and "cold" used in connection with a particular working or forming technique, refer to working or the characteristic of having been worked, as the case may be, in a temperature range from ambient temperature to no greater than about 677° C. In certain non-limiting embodiments, cold working occurs in a temperature range from ambient temperature to no greater than about 537.8° C. In certain other non-limiting embodiments, cold working occurs in a temperature range from ambient temperature to no greater than about 399° C. In certain other non-limiting embodiments, cold working occurs in a temperature range from ambient temperature to no greater than about 300° C. In a non-limiting embodiment, cold working comprises mechanically working a workpiece without preheating of the workpiece. Non-limiting examples of cold working involve processing a metallic article at such temperatures using one or more techniques selected from rolling, thread rolling, forging, pilgering, rocking, drawing, heading, flow-turning, rocking, bending, flattening, forging, stamping, liquid compressive forming, gas compressive forming, hydro-forming, bulge forming, roll forming, stamping, fine-blanking, die pressing, deep drawing, coining, spinning, swaging, impact extruding, explosive forming, rubber forming, back extrusion, piercing, spinning, stretch forming, press bending, and electromagnetic forming.

As used herein, the term "cold workable", when referring to a titanium alloy, refers to a titanium alloy that can be cold worked (as defined herein) without deleterious fracturing, macrocracking, and/or microcracking on a titanium alloy workpiece, such as a wire, for example with a preheat, or at a working temperature equal to or less than 398.9° C., or for example, at a working temperature equal to or less than 300° C. It is recognized that when cold working a titanium alloy sheet, a degree of edge cracking may occur, and is acceptable for a cold workable titanium alloy. As used herein, "macrocracking" refers to optically visible cracks and "microcracking" refers to crack formation on the size scale of the grain size of the particular alloy.

Reference herein to a titanium alloy "comprising" a particular composition is intended to encompass alloys "consisting essentially of" or "consisting of" the stated composition. It will be understood that titanium alloy compositions described herein "comprising", "consisting of", or "consisting essentially of" a particular composition also may include impurities.

Figure 2:
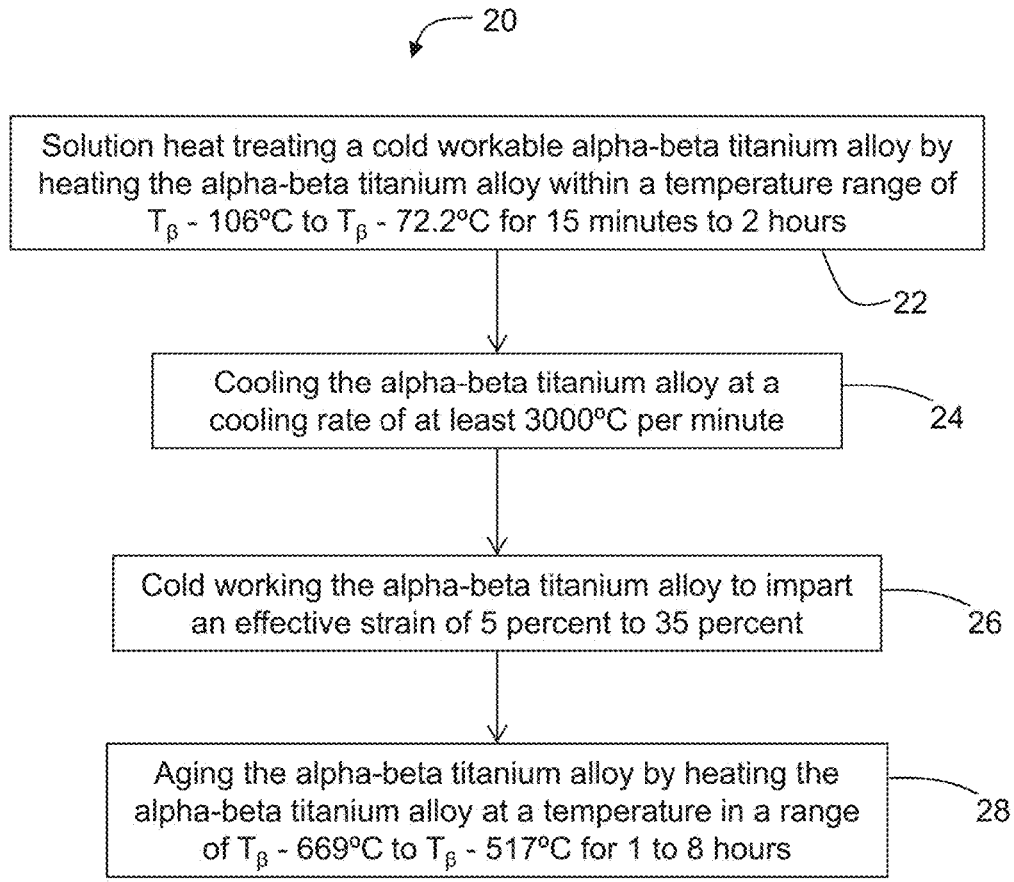
FIG. 2 is a flow diagram of a non-limiting embodiment of a method for increasing the tensile strength of a cold workable alpha-beta titanium alloy according to the present disclosure.

According to a non-limiting aspect of the present disclosure, and referring to FIG. 2, a method 20 for increasing the tensile strength of a cold workable alpha-beta titanium alloy comprises solution heat treating 22 a cold workable alpha-beta titanium alloy by heating the alpha-beta titanium alloy in a temperature range of $T_\beta$-106° C. to $T_\beta$-72.2° C. for 15 minutes to 2 hours. All heat treatment times herein and recited in the claims are "time at temperature", wherein the article is at the indicated temperature or is within the indicated temperature range through its entire thickness. In another non-limiting embodiment, solution heat treating the alpha-beta titanium alloy comprises heating the alpha-beta titanium alloy in a temperature range of $T_\beta$-97.2° C. to $T_\beta$-83.3° C. for 30 minutes to 1 hour.

After solution heat treating 22 the alpha-beta titanium alloy, the alloy is cooled 24 at a cooling rate of at least 3000° C./minute. In certain non-limiting embodiments of the method 20, the alpha-beta titanium alloy is cooled 24 by water cooling to achieve the cooling rate of at least 3000° C./minute. In other non-limiting embodiments of the method 20, the alpha-beta titanium alloy is cooled 24 by one of liquid quenching and gas quenching to achieve the cooling rate of at least 3000° C./minute. In certain non-limiting embodiments of the method 20, the alpha-beta titanium alloy is cooled 24 at a cooling rate sufficient to produce martensite upon cooling.

In certain non-limiting embodiments of the method 20, after cooling 24 the alpha-beta titanium alloy, the alloy is cold worked 26 to impart an effective strain in the range of 5 percent to 35 percent, or in the range of 10 percent to 30 percent, or in the range of 13 percent to 23 percent. As used herein, "effective strain" refers to strain that may be achieved during cold working from the combination of tensile, compressive, shear, and/or torsion loading of the alpha-beta titanium alloy. The resultant deformation of the titanium alloy imparts greater strength. The disclosed ranges of effective strain, i.e., 5-35%, or 10-30%, or 13-23%, represent the amount of effective strain that a cold workable alpha-beta titanium alloy of the present disclosure would be capable of withstanding without microcracking occurring in the microstructure. As used herein, effective strain (e) is determined by the following equation:

$$\bar{\dot{\varepsilon}} = \sqrt{2/3} \{\dot{\varepsilon}_1^2 + \dot{\varepsilon}_2^2 + \dot{\varepsilon}_3^2\}^{1/2} = 2/3[\frac{1}{2}\{(\dot{\varepsilon}_x - \dot{\varepsilon}_y)^2 + (\dot{\varepsilon}_y - \dot{\varepsilon}_z)^2 + (\dot{\varepsilon}_z - \dot{\varepsilon}_x)^2\} + 3/4(\dot{\gamma}_{xy}^2 + \dot{\gamma}_{xz}^2 + \dot{\gamma}_{zx}^2)]^{1/2},$$

wherein each of the variables is directed to a normal strain (ε) or a shear strain (γ), and the effective strain is the combination of each of these strains into a single variable. (See, e.g., Kobayashi et al., *Metal Forming and the Finite-Element Method*, Oxford Series on Advanced Manufacturing (Oxford University Press, New York, N.Y., 1989), p. 48. (ISBN: 0-19-504402-9)). Again referring to method 20, after cold working 26, the alpha-beta titanium alloy is aged 28 by heating in a temperature range of $T_\beta$-669° C. to $T_\beta$-517° C. for 1 to 8 hours.

In certain non-limiting embodiments of the method 20 for increasing the tensile strength of a cold workable alpha-beta titanium alloy according to the present disclosure, the alpha-beta titanium alloy comprises, in weight percentages based on total alloy weight: 2.9 to 5.0 aluminum; 2.0 to 3.0 vanadium; 0.4 to 2.0 iron; 0.2 to 0.3 oxygen; 0.005 to 0.3 carbon; optionally, one or more of tin, zirconium, molybdenum, chromium, nickel, silicon, copper, niobium, tantalum, manganese, cobalt, boron, and yttrium; titanium; and impurities. An example of an alpha-beta titanium alloy having this composition is disclosed in U.S. Pat. No. 5,980,655, issued Nov. 9, 1999, which is hereby incorporated herein by reference in its entirety.

In certain non-limiting embodiments of the method 20 for increasing the tensile strength of a cold workable alpha-beta titanium alloy according to the present disclosure, the alpha-beta titanium alloy comprises, in weight percentages based on total alloy weight: 2.5 to 3.5 aluminum; 2.0 to 3.0 vanadium; up to 0.20 iron; up to 0.15 oxygen; up to 0.050 carbon; up to 0.030 nitrogen; up to 0.015 hydrogen; optionally, one or more of tin, zirconium, molybdenum, chromium, nickel, silicon, copper, niobium, tantalum, manganese, cobalt, boron, and yttrium; titanium, and impurities. In a non-limiting embodiment, the sum of the weight percentages of any tin, zirconium, molybdenum, chromium, nickel, silicon, copper, niobium, tantalum, manganese, cobalt, boron, and yttrium present in the titanium alloy is less than 0.3 weight percent, wherein the individual concentrations of any tin, zirconium, molybdenum, chromium, nickel, silicon, copper, niobium, tantalum, manganese, and cobalt present in the alloy are each no greater than 0.1 weight percent, and the individual concentrations of any boron and yttrium present in the alloy are each less than 0.005 weight percent. An example of an alloy having the foregoing composition is Ti-3Al-2.5V alloy (UNS R56320).

In various non-limiting embodiments of a method 20 for increasing the tensile strength of a cold workable alpha-beta titanium alloy according to the present disclosure, the alpha-beta titanium alloy is selected from Ti-4.5Al-3V-2Mo-2Fe alloy (also known as "SP-700" alloy; UNS not assigned), Ti-5Al-4V-0.7Mo-0.5Fe alloy (also known as "TIMETAL 54M" alloy), and Ti-3Al-5Mo-5V-3Cr-0.4Fe alloy. A listing of chemical compositions of exemplary alpha-beta titanium alloys that may be processed as described herein follows. This listing provides compositions in weight percentages of the total alloy weight. If the concentration of titanium in a listed alloy is not specified, the alloy's balance is titanium and impurities. In all instances, incidental impurities are expected in the alloys. This listing should not be considered comprehensive and includes: Ti-6Al-4V alloy (UNS R56400) (carbon 0.10 maximum, oxygen 0.20 maximum, aluminum 5.5-6.75, vanadium 3.5-4.5, hydrogen 0.025 maximum, iron 0.30 maximum, others each 0.10 maximum, others total 0.4 maximum); Ti-3Al-2.5V alloy (UNS R56320) (titanium 92.755-95.5, aluminum 2.5-3.5, vanadium 2.0-3.0, iron 0.25 maximum, oxygen 0.15 maximum, carbon 0.1 maximum, nitrogen 0.03 maximum, hydrogen 0.015 maximum, other elements each 0.10 maximum, others elements total 0.40 maximum); Ti-4.5Al-3V-2Mo-2Fe alloy (also known as SP700 alloy) (niobium 6.5-7.5, aluminum 4.0-5.0, vanadium 2.5-3.5, molybdenum 1.8-2.2, iron 1.7-2.3, carbon 0.80 maximum, oxygen 0.15 maximum, nitrogen 0.050 maximum, hydrogen 0.010 maximum, yttrium 0.0050 maximum, other elements each 0.10 maximum, others elements total 0.40 maximum); Ti-5Al-4V-0.7Mo-0.5Fe alloy (also known as "TIMETAL 54M" alloy and disclosed in U.S. Pat. No. 6,786,985, which is incorporated by reference in its entirety herein) (aluminum 4.5-5.5, vanadium 3.0-5.0, molybdenum 0.3-1.8, iron 0.2-1.2, oxygen 0.12-0.25, other elements each less than 0.1, other elements total less than 0.5); Ti-3Al-5Mo-5V-3Cr-0.5Fe alloy (also known as Ti-3553 alloy and disclosed in U.S. Pat. No. 6,632,396, which is incorporated by reference in its entirety herein) (aluminum 2.2 to 3.8, vanadium 4.5-5.9, molybdenum 4.5-5.9, chromium 2.0-3.6, iron 0.2-0.8, zirconium 0.01-0.08, carbon 0.01 to 0.25, oxygen 0.03 to 0.25); and ATI 425® alloy (Grade 38, available from Allegheny Technologies Incorporated, Pittsburgh, Pa. USA) (aluminum 3.5-4.5, vanadium 2.0-3.0, iron 1.2-1.8, oxygen 0.2-0.30, carbon 0.08 maximum, nitrogen 0.03 maximum, hydrogen 0.015 maximum, other elements each 0.10 maximum, others elements total 0.30 maximum).

According to certain non-limiting embodiments of the method 20 for increasing the tensile strength of a cold workable alpha-beta titanium alloy according to the present disclosure, cold working 26 the alpha-beta titanium alloy is performed at a temperature less than 676.7° C. In another non-limiting embodiment of the method 20 according to the present disclosure, the alpha-beta titanium alloy is cold worked 26 at a temperature no greater than 300° C. In yet another non-limiting embodiment of the method 20 according to the present disclosure, the alpha-beta titanium alloy is cold worked 26 at a temperature less than 200° C. In still another non-limiting embodiment of the method 20 according to the present disclosure, the alpha-beta titanium alloy is cold worked 26 in a temperature range of −100° C. to +200° C. In still another non-limiting embodiment of the method 20 according to the present disclosure, the alpha-beta titanium alloy is cold worked 26 at a temperature less than 537.8° C.

According to various non-limiting embodiments of the method 20 for increasing the tensile strength of a cold workable alpha-beta titanium alloy of the present disclosure, cold working 26 the alpha-beta titanium alloy comprises at least one of rolling, forging, extruding, pilgering, rocking, drawing, flow-turning, liquid compressive forming, gas compressive forming, hydro-forming, bulge forming, roll forming, stamping, fine-blanking, die pressing, deep drawing, coining, spinning, swaging, impact extruding, explosive forming, rubber forming, back extrusion, piercing, spinning, stretch forming, press bending, electromagnetic forming, and cold heading the alpha-beta titanium alloy. In certain non-limiting embodiments of the method 20 for increasing the tensile strength of a cold workable alpha-beta titanium alloy according to the present disclosure, cold working 26 the alpha-beta titanium alloy comprises drawing the alpha-beta titanium alloy. In other non-limiting embodiments of the method 20 for increasing the tensile strength of a cold workable alpha-beta titanium alloy according to the present disclosure, cold working 26 the alpha-beta titanium alloy comprises swaging the alpha-beta titanium alloy.

Again referring to FIG. 2, after cold working 26 the alpha-beta titanium alloy, the alpha-beta titanium alloy is aged 28. In non-limiting embodiments of the method 20, aging 28 the alpha-beta titanium alloy comprises heating the alpha-beta titanium alloy in a temperature range of $T_\beta$-622° C. to $T_\beta$-581° C. for 1 to 5 hours. In certain non-limiting embodiments, aging 28 the alpha-beta titanium alloy comprises heating the alpha-beta titanium alloy in a temperature range of 302° C. to 454° C. for 1 to 8 hours. In other non-limiting embodiments, aging the alpha-beta titanium alloy comprises heating the alpha-beta titanium alloy in a temperature range of 349° C. to 391° C. for 1 to 5 hours. In various embodiments of the method 20, the aging 28 step can develop significantly higher strength in the alloy, such as 1,450 MPa, for example, while maintaining at least 7% elongation to failure in a 4D tensile gage (4 times the diameter of the specimen) as measured according to specification ASTM E8 2015.

In certain non-limiting embodiments of a method 20 for increasing the tensile strength of a cold workable alpha-beta titanium alloy according to the present disclosure, prior to solution heat treating 22 the alpha-beta titanium alloy, the alpha-beta titanium alloy is hot worked (not shown in FIG. 2). In a non-limiting embodiment of the method 20, hot working (not shown) the alpha-beta titanium alloy comprises heating the alpha-beta titanium alloy in a temperature range of $T_\beta$-83.3° C. to $T_\beta$-28° C. In various non-limiting embodiments, the alpha-beta titanium alloy can be hot worked by at least one of rolling, drawing, swaging, equal channel angular pressing, extrusion, thread rolling, forging, flattening, bending, or straightening the alpha-beta titanium alloy.

A person skilled in the art understands that hot working an alpha-beta titanium alloy involves plastically deforming the titanium alloy at temperatures above the recrystallization temperature of the alloy. In certain non-limiting embodiments, the alpha-beta titanium alloy may be hot worked at temperatures in the beta phase field of the alpha-beta titanium alloy. In a particular non-limiting embodiment, the alpha-beta titanium alloy is heated to at least $T_\beta$+30° C., and hot worked. In certain non-limiting embodiments, the alpha-beta titanium alloy may be hot worked in the beta phase field of the titanium alloy and subjected to at least a 20 percent reduction in thickness or cross-sectional area. In certain non-limiting embodiments, after hot working the alpha-beta titanium alloy in the beta phase field, the alpha-beta titanium alloy may be cooled to ambient temperature at a cooling rate that is at least as great as the cooling rate achieved from air cooling.

Intermediate the step of cooling 24 the alpha-beta titanium alloy and the step of cold working 26 the alpha-beta titanium alloy, in certain non-limiting embodiments, the alpha-beta titanium alloy is surface conditioned (not shown in FIG. 2). In various non-limiting embodiments, intermediate the step of cold working 26 the alpha-beta titanium alloy and the step of aging 28 the alpha-beta titanium alloy, the alpha-beta titanium alloy is surface conditioned (not shown in FIG. 2). Surface conditioning techniques are known to persons having ordinary skill in the art, and include, for example lathe turning, milling, peeling, sanding, polishing, chemical milling, electrochemical milling, electrodischarge machining, and water-jet techniques.

In various non-limiting embodiments of the method 20, after the step of cold working 26 the alpha-beta titanium alloy and/or the step of aging 28 the alpha-beta titanium alloy, the alpha-beta titanium alloy is finished (not shown). Methods of finishing are known to persons having ordinary skill in the art, and include, for example lathe turning, milling, peeling, sanding, polishing, chemical milling, electrochemical milling, electrodischarge machining, and water-jet techniques. In a particular non-limiting embodiment of method 20, finishing comprises machining the alpha-beta titanium alloy.

Figure 3:
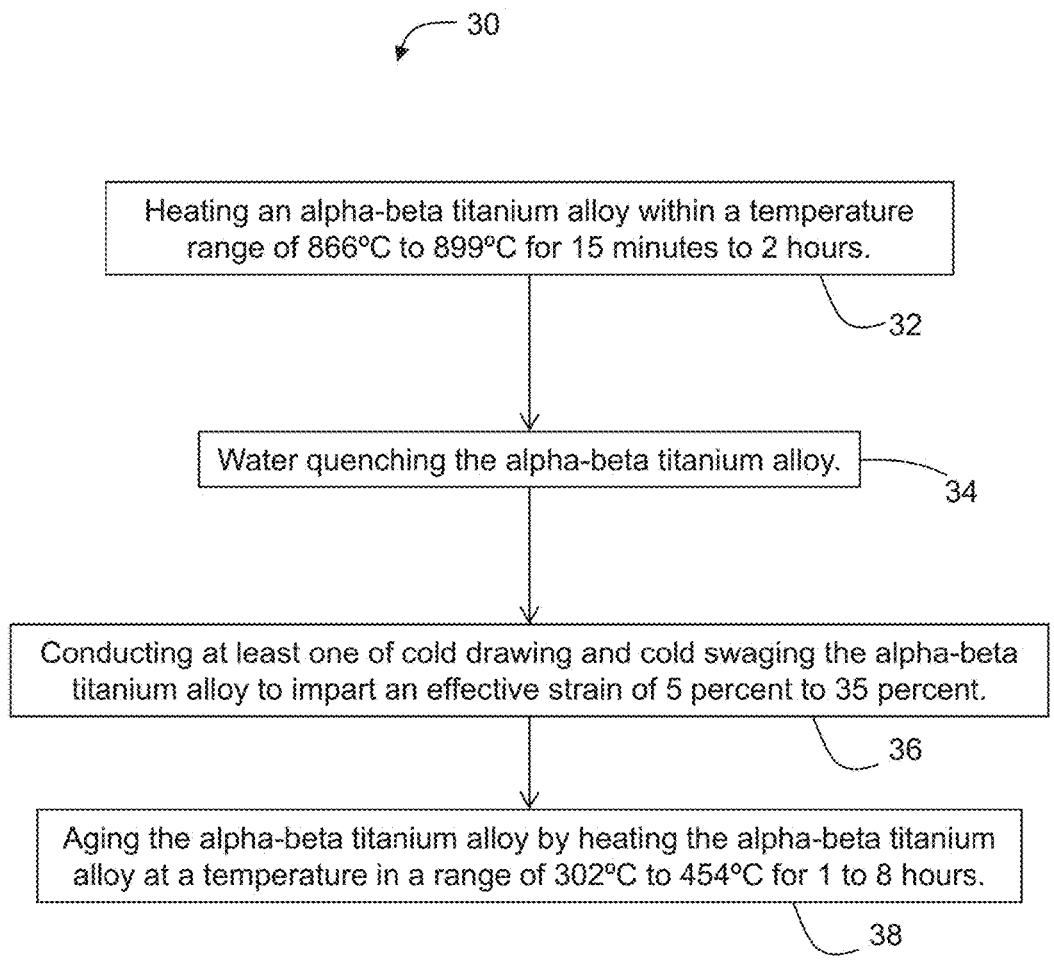
FIG. 3 is a flow diagram of a non-limiting embodiment of a method for producing an alpha-beta titanium alloy fastener stock according to the present disclosure.

Referring now to FIG. 3, another aspect of the present disclosure is directed to a method 30 for producing alpha-beta titanium alloy fastener stock. In a particular non-limiting embodiment of the method 30, the alpha-beta titanium alloy comprises ATI 425® alpha-beta titanium alloy. In various embodiments, the ATI 425® alpha-beta titanium alloy comprises, in percentages by weight: 2.9 to 5.0 aluminum; 2.0 to 3.0 vanadium; 0.4 to 2.0 iron; 0.2 to 0.3 oxygen; 0.005 to 0.3 carbon; titanium, and impurities. The alloy optionally comprises one or more of tin, zirconium, molybdenum, chromium, nickel, silicon, copper, niobium, tantalum, manganese, cobalt, boron and yttrium. The sum of the weight percentages of any tin, zirconium, molybdenum, chromium, nickel, silicon, copper, niobium, tantalum, manganese, cobalt, boron, and yttrium present in the titanium alloy is less than 0.5 weight percent, wherein the individual concentrations of any tin, zirconium, molybdenum, chromium, nickel, silicon, copper, niobium, tantalum, manganese, and cobalt present in the alloy are each no greater than 0.1 weight percent, and the individual concentrations of any boron and yttrium present in the alloy are each less than 0.005 weight percent.

Non-limiting embodiments of the method 30 for producing an alpha-beta titanium alloy fastener stock comprise heating 32 the alpha-beta titanium alloy in a temperature range of 866° C. to 899° C. for 15 minutes to 2 hours or, alternatively, heating the alpha-beta titanium alloy in a temperature range of 874° C. to 888° C. for 30 minutes to 1 hour. A person having ordinary skill in the art will recognize this heating step to be a solution heat treatment of the alpha-beta titanium alloy, and such person, upon considering the present disclosure, can adjust the heating temperatures and times to suitably solution heat treat different alpha-beta titanium alloys, without undue experimentation.

Again referring to method 30 shown in FIG. 3, after heating 32 the alpha-beta titanium alloy, the alpha-beta titanium alloy is water quenched 34. Other methods of cooling the alpha-beta titanium alloy known to a person of ordinary skill in the art may be used. Any such cooling method preferably provides a cooling rate that is at least a great as the cooling rate needed to form martensite phase in the alpha-beta titanium alloy on cooling. After quenching 34, the alpha-beta titanium alloy is cold worked 36. In various non-limiting embodiments of the method 30, cold working 36 comprises at least one of cold drawing and cold swaging the alpha-beta titanium alloy to impart an effective strain in the range of 5 percent to 35 percent, or in the range of 10 percent to 30 percent, or in the range of 13 percent to 23 percent. In certain non-limiting embodiments of the method 30, cold working 36 the alpha-beta titanium alloy (by a method comprising cold swaging and/or cold drawing, or by another method) comprises working the alpha-beta titanium alloy at temperatures less than 677° C., or less than 537.8° C. In other non-limiting embodiments of the method 30, cold working 36 the alpha-beta titanium alloy (by a method comprising cold swaging and/or cold drawing, or by another method) comprises working the alpha-beta titanium alloy at temperatures no greater than 300° C. In yet other non-limiting embodiments of the method 30, cold working 36 the alpha-beta titanium alloy (whether by cold swaging and/or cold drawing, or by another method) comprises working the alpha-beta titanium alloy at temperatures less than 200° C. In still other non-limiting embodiments of the method 30, the alpha-beta titanium alloy is cold worked 36 by a method comprising cold swaging and/or cold drawing, or by another method, in a temperature range of −100° C. to +200° C.

Again referring to FIG. 3, subsequent to cold working 36 the alpha-beta titanium alloy, the alloy is aged 38. In certain non-limiting embodiments, aging the alpha-beta titanium alloy comprises heating the alloy in a temperature range of 302° C. to 454° C. for 1 to 8 hours. In other non-limiting embodiments, aging 38 the alpha-beta titanium alloy comprises heating the alloy in a temperature range of 349° C. to 391° C. for 1 to 5 hours. In various non-limiting embodiments of the method 30, the aging 38 step can develop significantly higher strength in the alloy, such as 1450 MPa, for example, while maintaining at least 7% elongation to failure in a 4D tensile gage (4 times the diameter of the specimen), as measured according to specification ASTM E8 2015.

In various non-limiting embodiments of the method 30, prior to the step of heating 32 the alpha-beta titanium alloy, the alpha-beta titanium alloy is hot worked (not shown in FIG. 3). In certain non-limiting embodiments, the hot working step comprises at least one of rolling, extrusion, equal channel angle extrusion, drawing, and swaging the alpha-beta titanium alloy. In other non-limiting embodiments, the hot working step comprises hot rolling the alpha-beta titanium alloy to an article having a diameter in the range of 0.25 inch (0.635 cm) to 2.0 inch (5.08 cm). In certain non-limiting embodiments, hot working (not shown) the alpha-beta titanium alloy comprises heating the alpha-beta titanium alloy in a temperature range of $T_\beta$-83.3° C. to $T_\beta$-28° C. In non-limiting embodiments of the method 30, the alpha-beta titanium alloy is Ti-4Al-2.5V alloy (UNS R54250), such as ATI 425® alloy, and hot working comprises working the alloy in the temperature range of 888° C. to 943° C.

As noted above, persons skilled in the art understand that hot working an alpha-beta titanium alloy involves plastically deforming the alloy at temperatures above the recrystallization temperature of the alloy. In certain non-limiting embodiments of the method 30, the alpha-beta titanium alloy may be hot worked at temperatures in the beta phase field of the alpha-beta titanium alloy. In certain non-limiting embodiments, the alpha-beta titanium alloy is worked at a temperature of at least $T_\beta$+30° C. In certain non-limiting embodiments, the alpha-beta titanium alloy may be hot worked at temperatures in the beta phase field of the titanium alloy so as to provide at least a 20 percent reduction in thickness or cross-sectional area. In certain non-limiting embodiments of the method 30, after hot working the alpha-beta titanium alloy in the beta phase field, the alloy is cooled to ambient temperature at a cooling rate that is at least as great as the cooling rate achieved with air cooling.

In certain non-limiting embodiments of method 30, after hot working (not shown in FIG. 3) the alpha-beta titanium alloy may be cut into short, straight lengths, or may be coiled. If coiled, the alloy may be cut into straight lengths between any two steps of the method 30.

Intermediate the step of quenching 34 the alpha-beta titanium alloy and the step of cold working 36 the alpha-beta titanium alloy, in certain non-limiting embodiments of the method 30, the alpha-beta titanium alloy may be surface conditioned (not shown in FIG. 3). In various non-limiting embodiments, intermediate the step of cold working 36 the alpha-beta titanium alloy and the step of aging 38 the alpha-beta titanium alloy, the alpha-beta titanium alloy is surface conditioned (not shown in FIG. 3). Surface conditioning techniques are known to persons having ordinary skill in the art, and include, for example lathe turning, milling, peeling, sanding, polishing, chemical milling, electrochemical milling, electrodischarge machining, and waterjet techniques.

Another aspect of the present disclosure includes an article of manufacture selected from a titanium alloy fastener and titanium alloy fastener stock. The article of manufacture may be made by a method as described in the present disclosure, for example. In various embodiments, the article of manufacture includes a hot rolled, solution treated, and cold worked alpha-beta titanium alloy comprising, in weight percentages based on total alloy weight: 2.9 to 5.0 aluminum; 2.0 to 3.0 vanadium; 0.4 to 2.0 iron; 0.2 to 0.3 oxygen; 0.005 to 0.3 carbon; 0.001 to 0.02 nitrogen; titanium; and impurities. The alloy optionally comprises one or more of tin, zirconium, molybdenum, chromium, nickel, silicon, copper, niobium, tantalum, manganese, cobalt, boron and yttrium. The sum of the weight percentages of any tin, zirconium, molybdenum, chromium, nickel, silicon, copper, niobium, tantalum, manganese, cobalt, boron, and yttrium present in the titanium alloy is less than 0.5 weight percent, wherein the individual concentrations of any tin, zirconium, molybdenum, chromium, nickel, silicon, copper, niobium, tantalum, manganese, and cobalt present in the alloy are each no greater than 0.1 weight percent, and the individual concentrations of any boron and yttrium present in the alloy are each less than 0.005 weight percent. In a non-limiting embodiment, the article of manufacture comprising a hot rolled, solution treated, and cold worked alpha-beta titanium alloy is fastener stock that may be in the form, for example, a straight length. In non-limiting embodiments, the article of manufacture comprising a hot rolled, solution treated, and cold worked alpha-beta titanium alloy is in the form of a fastener selected from, for example, a bolt, a nut, a stud, a screw, a washer, a lock washer, and a rivet.

The examples that follow are intended to further describe certain non-limiting embodiments, without restricting the scope of the present invention. Persons having ordinary skill in the art will appreciate that variations of the following examples are possible within the scope of the invention, which is defined solely by the claims.

Example 1

Figure 4:
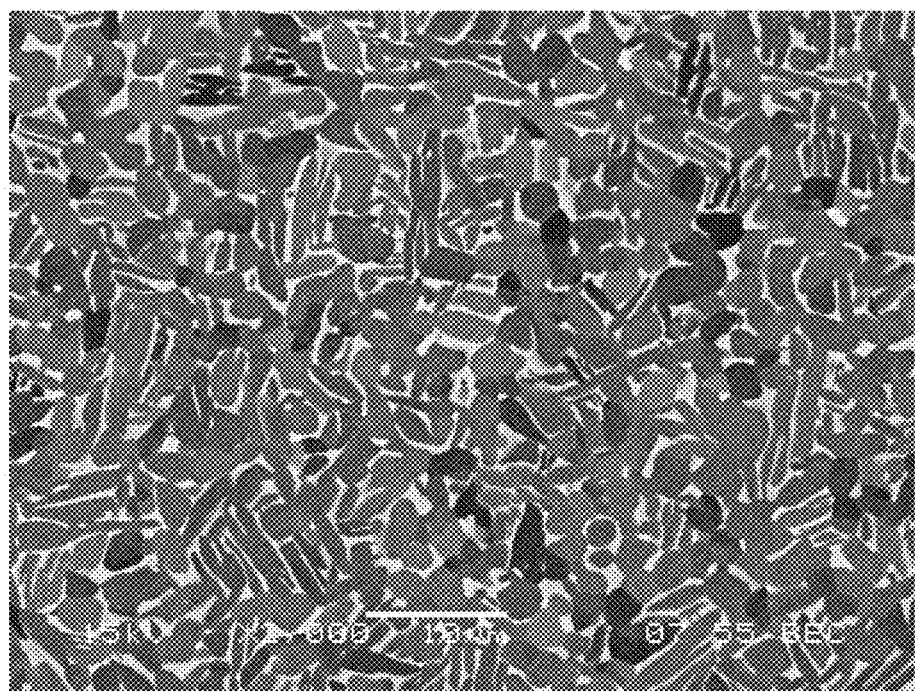
FIG. 4 is a scanning electron micrograph depicting the microstructure of an embodiment of a fastener stock of a mill annealed ATI 425® alloy.

An ingot of ATI 425® alloy was hot forged and subsequently hot rolled to 0.25 inch (6.35 mm) diameter wire for fastener stock. The wire was mill annealed by heating the wire to 760° C. and maintaining at temperature for 60 minutes. The microstructure of the mill annealed ATI 425® alloy wire is shown in the micrograph of FIG. 4. It can be seen from FIG. 4 that the microstructure comprises equiaxed primary alpha grains with small amounts of lenticular secondary alpha.

Example 2

Figure 5:
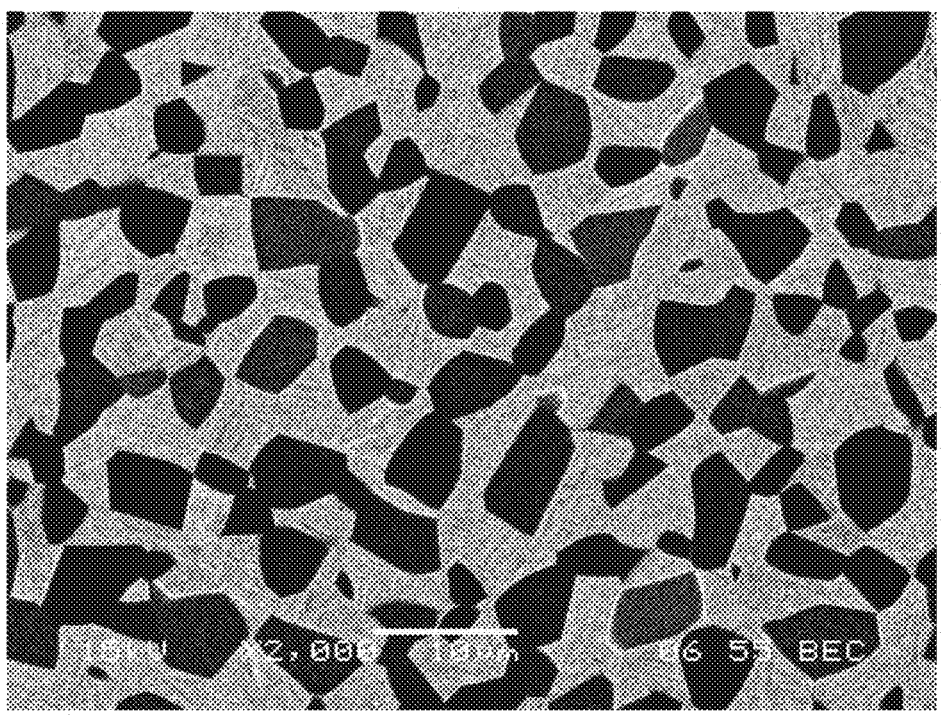
FIG. 5 is a scanning electron micrograph depicting the microstructure of an embodiment of a fastener stock of ATI 425® alloy that was solution treated and quenched according to a non-limiting method embodiment of the present disclosure.

The mill annealed wire fastener stock of Example 1 was solution treated at (760° C.) for 60 minutes (time at temperature), and then water quenched. The microstructure of the solution treated and quenched ATI 425® alloy wire fastener stock is shown in the micrograph of FIG. 5. It can be seen from FIG. 5 that the microstructure comprises a smaller amount of primary alpha grains than in Example 1, and both more numerous and smaller acicular-shaped secondary alpha.

Example 3

Figure 6:
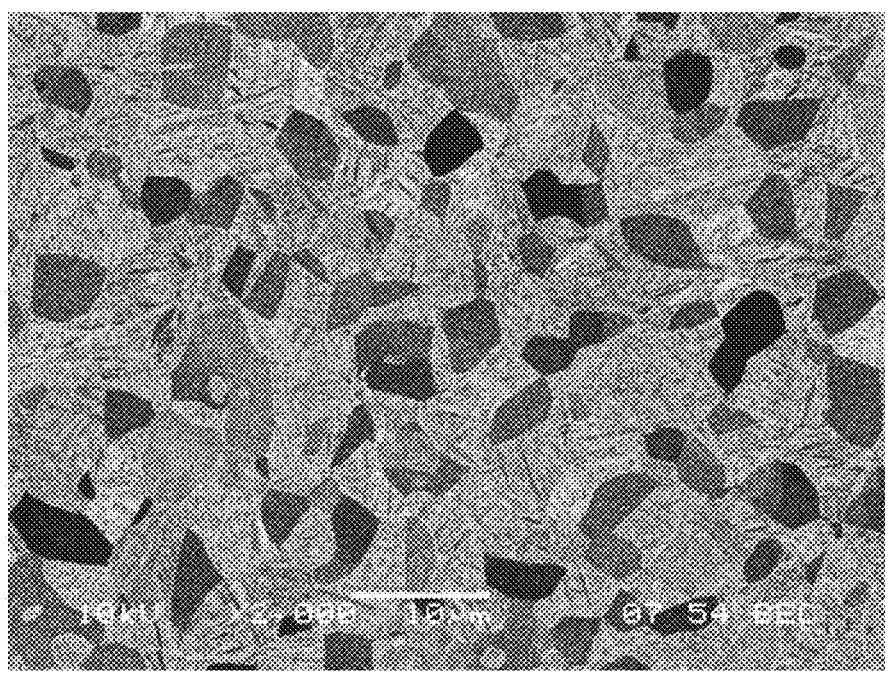
FIG. 6 is a scanning electron micrograph depicting the microstructure of an embodiment of a fastener stock of Ti-6Al-4V alloy that was solution treated and quenched according to a non-limiting method embodiment of the present disclosure.

Ti-6Al-4V alloy (UNS 56400; available from Allegheny Technologies Incorporated) was hot forged and subsequently hot rolled to 0.25 inch (6.35 mm) diameter wire for fastener stock. The hot rolled wire was solution treated and quenched in the manner used in Example 2. The microstructure of the solution treated and quenched Ti-6Al-4V alloy wire fastener stock is shown in the micrograph of FIG. 6. It can be seen from FIG. 6 that the microstructure comprises primary alpha grains with a matrix of acicular secondary alpha precipitated from a quenched martensite.

Example 4

ATI 425® alloy was hot rolled to a wire having a nominal size of 0.25 inch in diameter. After hot rolling, the wire was either cut into straight lengths or left coiled. Subsequently, the material was solution treated in a furnace at temperatures of 865.6° C., 879.4° C., or 893.3° C. for 1 hour, followed by water quenching. The cooled material was then cold drawn to impart an effective strain of 10%, 15%, and 20%. The effective strain for these samples also corresponded to a percent reduction in cross-sectional area. The material's surface was conditioned after cold drawing to remove any surface imperfections. The surface conditioned material was then aged in a furnace by heating at 350° C., 365° C., or 380° C. for 2, 3, or 4 hours. The process conditions for the samples and mechanical test results are presented in Table 1. Tensile tests were performed in accordance with ASTM E8 2015.

TABLE 1

Tensile Results (mean) for ATI 425 ® alloy Samples

| Sample # | Solution Treatment Temp. (° C.) | Effective Strain (Percent Reduction Cross Sectional Area) | Aging Temp. (° C.) | Aging Time (hrs.) | UTS (ksi) | YS (ksi) | 4D % E | % RA |
|---|---|---|---|---|---|---|---|---|
| 1 | 865.6 | 10 | 365 | 3 | 208.0 | 177.6 | 12.3 | 37.0 |
| 2 | 865.6 | 20 | 365 | 3 | 218.5 | 188.8 | 12.7 | 31.3 |
| 3 | 893.3 | 10 | 365 | 3 | 212.5 | 187.6 | 12.3 | 33.7 |
| 4 | 893.3 | 20 | 365 | 3 | 215.8 | 193.5 | 12.0 | 33.0 |
| 5 | 879.4 | 15 | 350 | 2 | 211.9 | 189.5 | 12.3 | 35.3 |
| 6 | 879.4 | 15 | 350 | 4 | 208.8 | 183.3 | 11.3 | 32.0 |
| 7 | 879.4 | 15 | 380 | 2 | 205.1 | 180.5 | 14.0 | 37.7 |
| 8 | 879.4 | 15 | 380 | 4 | 204.2 | 179.1 | 12.3 | 28.0 |
| 9 | 879.4 | 15 | 365 | 3 | 212.4 | 189.3 | 12.3 | 33.3 |
| 10 | 865.6 | 15 | 365 | 2 | 214.6 | 193.8 | 10.7 | 28.0 |
| 11 | 865.6 | 15 | 365 | 4 | 213.5 | 186.6 | 11.3 | 33.3 |
| 12 | 893.3 | 15 | 365 | 2 | 208.7 | 181.9 | 13.3 | 33.7 |
| 13 | 893.3 | 15 | 365 | 4 | 213.2 | 189.4 | 11.3 | 33.7 |
| 14 | 879.4 | 10 | 350 | 3 | 207.8 | 180.8 | 14.0 | 32.0 |
| 15 | 879.4 | 10 | 380 | 3 | 210.6 | 188.4 | 12.5 | 36.0 |
| 16 | 879.4 | 20 | 350 | 3 | 223.4 | 204.7 | 10.7 | 28.7 |
| 17 | 879.4 | 20 | 380 | 3 | 205.5 | 179.6 | 11.7 | 35.3 |
| 18 | 879.4 | 15 | 365 | 3 | 206.6 | 181.3 | 10.0 | 30.7 |
| 19 | 865.6 | 15 | 350 | 3 | 211.6 | 188.8 | 10.7 | 35.3 |
| 20 | 865.6 | 15 | 380 | 3 | 211.6 | 189.8 | 13.0 | 36.0 |

TABLE 1-continued

Tensile Results (mean) for ATI 425 ® alloy Samples

| Sample # | Solution Treatment Temp. (° C.) | Effective Strain (Percent Reduction Cross Sectional Area) | Aging Temp. (° C.) | Aging Time (hrs.) | UTS (ksi) | YS (ksi) | 4D % E | % RA |
|---|---|---|---|---|---|---|---|---|
| 21 | 893.3 | 15 | 350 | 3 | 215.8 | 197.9 | 11.3 | 26.3 |
| 22 | 893.3 | 15 | 380 | 3 | 214.3 | 191.4 | 9.3 | 26.0 |
| 23 | 879.4 | 10 | 365 | 2 | 207.2 | 176.5 | 12.3 | 35.7 |
| 24 | 879.4 | 10 | 365 | 4 | 209.9 | 185.1 | 10.7 | 32.3 |
| 25 | 879.4 | 20 | 365 | 2 | 210.3 | 185.5 | 11.0 | 36.5 |
| 26 | 879.4 | 20 | 365 | 4 | 218.5 | 196.8 | 11.0 | 26.0 |
| 27 | 879.4 | 15 | 365 | 3 | 209.1 | 188.1 | 13.0 | 35.3 |

It is observed from Table 1 that the aged samples develop significantly higher strength than any commercially available titanium fastener while maintaining at least 7% elongation to failure in a 4D tensile gage. Commercially available titanium fasteners, such as those specified in AMS 4967 rev L, meet a strength requirement of 1137 MPa (165 KSI) and 10% elongation to failure in a 4D tensile gage.

It will be understood that the present description illustrates those aspects of the invention relevant to a clear understanding of the invention. Certain aspects that would be apparent to those of ordinary skill in the art and that, therefore, would not facilitate a better understanding of the invention have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the foregoing description and the following claims.

What is claimed is:

1. A method for increasing tensile strength of a cold workable alpha-beta titanium alloy, comprising:
   solution heat treating a cold workable alpha-beta titanium alloy by heating the alpha-beta titanium alloy in a temperature range of the alpha-beta titanium alloy's beta transus temperature $(T_\beta)$-106° C. to $T_\beta$-72.2° C. for 15 minutes to 2 hours;
   cooling the alpha-beta titanium alloy at a cooling rate of at least 3000° C. per minute to ambient temperature;
   cold working the alpha-beta titanium alloy to impart an effective strain in the range of 13 percent to 35 percent; and
   aging the alpha-beta titanium alloy by heating the alpha-beta titanium alloy in a temperature range of $T_\beta$-669° C. to $T_\beta$-517° C. for 1 to 8 hours, wherein after the aging the alpha-beta titanium alloy exhibits an ultimate tensile strength of at least 204.2 ksi.

2. The method of claim 1, wherein the alpha-beta titanium alloy comprises, in weight percentages based on total alloy weight:
   2.9 to 5.0 aluminum;
   2.0 to 3.0 vanadium;
   0.4 to 2.0 iron;
   0.2 to 0.3 oxygen;
   0.005 to 0.3 carbon;
   titanium;
   impurities; and
   optionally, one or more of tin, zirconium, molybdenum, chromium, nickel, silicon, copper, niobium, tantalum, manganese, cobalt, boron and yttrium;
   wherein the sum of the weight percentages of any tin, zirconium, molybdenum, chromium, nickel, silicon, copper, niobium, tantalum, manganese, cobalt, boron, and yttrium present in the titanium alloy is less than 0.5 weight percent;
   wherein the individual concentrations of any tin, zirconium, molybdenum, chromium, nickel, silicon, copper, niobium, tantalum, manganese, and cobalt present in the alloy are each no greater than 0.1 weight percent;
   wherein the individual concentrations of any boron and yttrium present in the alloy are each less than 0.005 weight percent.

3. The method of claim 1, wherein the alpha-beta titanium alloy comprises in weight percentages:
   2.5 to 3.5 aluminum;
   2.0 to 3.0 vanadium;
   up to 0.20 iron;
   up to 0.15 oxygen;
   up to 0.050 carbon;
   up to 0.030 nitrogen;
   up to 0.015 hydrogen;
   titanium;
   impurities; and
   optionally, one or more of tin, zirconium, molybdenum, chromium, nickel, silicon, copper, niobium, tantalum, manganese, cobalt, boron and yttrium;
   wherein the sum of the weight percentages of any tin, zirconium, molybdenum, chromium, nickel, silicon, copper, niobium, tantalum, manganese, cobalt, boron, and yttrium present in the titanium alloy is less than 0.3 weight percent;
   wherein the individual concentrations of any tin, zirconium, molybdenum, chromium, nickel, silicon, copper, niobium, tantalum, manganese, and cobalt present in the alloy are each no greater than 0.1 weight percent;
   wherein the individual concentrations of any boron and yttrium present in the alloy are each less than 0.005 weight percent.

4. The method of claim 1, where the alpha-beta titanium alloy is selected from Ti-4.5Al-3V-2Mo-2Fe alloy, Ti-5Al-4V-0.7Mo-0.5Fe alloy, and Ti-3Al-5Mo-5V-3Cr-0.4Fe alloy.

5. The method of claim 1, wherein cooling the alpha-beta titanium alloy comprises quenching the alpha-beta titanium alloy in water.

6. The method of claim 1, wherein cold working the alpha-beta titanium alloy comprises working the alpha-beta titanium alloy at temperatures less than 676.7° C.

7. The method of claim 1, wherein cold working the alpha-beta titanium alloy comprises working the alpha-beta titanium alloy at temperatures less than 537.8° C.

8. The method of claim 1, wherein cold working the alpha-beta titanium alloy comprises at least one of rolling, forging, extruding, pilgering, rocking, drawing, flow-turning, liquid compressive forming, gas compressive forming, hydro-forming, bulge forming, roll forming, stamping, fine-blanking, die pressing, deep drawing, coining, spinning, swaging, impact extruding, explosive forming, rubber forming, back extrusion, piercing, spinning, stretch forming, press bending, electromagnetic forming, and cold heading the alpha-beta titanium alloy.

9. The method of claim 1, wherein cold working the alpha-beta titanium alloy comprises drawing the alpha-beta titanium alloy.

10. The method of claim 1, wherein cold working the alpha-beta titanium alloy comprises swaging the alpha-beta titanium alloy.

11. The method of claim 1, wherein cold working the alpha-beta titanium alloy imparts an effective strain in the range of 13 percent to 30 percent to the alpha-beta titanium alloy.

12. The method of claim 1, wherein cold working the alpha-beta titanium alloy imparts an effective strain in the range of 13 percent to 23 percent to the alpha-beta titanium alloy.

13. The method of claim 1, wherein solution heat treating the alpha-beta titanium alloy comprises heating the alpha-beta titanium alloy in a temperature range of $T_\beta$-97.2° C. to $T_\beta$-83.3° C. for 30 minutes to 1 hour.

14. The method of claim 1, wherein aging the alpha-beta titanium alloy comprises heating the alpha-beta titanium alloy in a temperature range of $T_\beta$-622° C. to $T_\beta$-581° C. for 1 to 5 hours.

15. The method of claim 1, further comprising, prior to solution heat treating the alpha-beta titanium alloy, hot working the alpha-beta titanium alloy.

16. The method of claim 15, wherein hot working the alpha-beta titanium alloy comprises heating the alpha-beta titanium alloy in a temperature range of $T_\beta$-83.3° C. to $T_\beta$-28° C.

17. The method of claim 15, wherein hot working the alpha-beta titanium alloy comprises at least one of rolling, forging, extruding, pilgering, rocking, drawing, flow-turning, liquid compressive forming, gas compressive forming, hydro-forming, bulge forming, roll forming, stamping, fine-blanking, die pressing, deep drawing, coining, spinning, swaging, impact extruding, explosive forming, rubber forming, back extrusion, piercing, spinning, stretch forming, press bending, electromagnetic forming, and cold heading the alpha-beta titanium alloy.

18. The method of claim 1, further comprising, intermediate cooling the alpha-beta titanium alloy and cold working the alpha-beta titanium alloy, surface conditioning the alpha-beta titanium alloy.

19. The method of claim 1, further comprising, intermediate the step of cold working the alpha-beta titanium alloy and the step of aging the alpha-beta titanium alloy, surface conditioning the alpha-beta titanium alloy.

20. The method of claim 1, further comprising, after at least one of the step of cold working the alpha-beta titanium alloy and the step of aging the alpha-beta titanium alloy, finishing the alpha-beta titanium alloy.

21. The method of claim 20, wherein finishing the alpha-beta titanium alloy comprises machining the alpha-beta titanium alloy.

* * * * *